United States Patent
Ohmori et al.

(10) Patent No.: US 10,946,843 B2
(45) Date of Patent: Mar. 16, 2021

(54) VEHICLE TRAVEL ASSISTANCE SYSTEM

(71) Applicant: ADVICS CO., LTD., Kariya (JP)

(72) Inventors: Yosuke Ohmori, Kariya (JP); Masaki Shiota, Kariya (JP); Yosuke Yamada, Kariya (JP); Yukio Mori, Kariya (JP)

(73) Assignee: ADVICS CO., LTD., Kariya (JP)

( * ) Notice: Subject to any disclaimer, the term of this patent is extended or adjusted under 35 U.S.C. 154(b) by 83 days.

(21) Appl. No.: 15/763,732

(22) PCT Filed: Sep. 29, 2016

(86) PCT No.: PCT/JP2016/078922
§ 371 (c)(1),
(2) Date: Mar. 27, 2018

(87) PCT Pub. No.: WO2017/077795
PCT Pub. Date: May 11, 2017

(65) Prior Publication Data
US 2018/0281763 A1    Oct. 4, 2018

(30) Foreign Application Priority Data

Nov. 6, 2015  (JP) ............................. JP2015-218704

(51) Int. Cl.
*G08G 1/123*   (2006.01)
*G01S 5/14*    (2006.01)
(Continued)

(52) U.S. Cl.
CPC ............ *B60T 8/17558* (2013.01); *B60T 7/12* (2013.01); *B60T 8/1755* (2013.01);
(Continued)

(58) Field of Classification Search
None
See application file for complete search history.

(56) References Cited

U.S. PATENT DOCUMENTS 6,625,539 B1 *   9/2003  Kittell ..................... B60L 50/66
                                                    701/29.3
9,296,374 B2 *   3/2016  Yamakado ........... B60W 40/114
(Continued)

FOREIGN PATENT DOCUMENTS

JP    2001-247023 A    9/2001
JP    2010-47047 A     3/2010
(Continued)

OTHER PUBLICATIONS

International Search Report dated Dec. 20, 2016 in PCT/JP2016/078922 filed Sep. 29, 2016.

*Primary Examiner* — Adam D Tissot
*Assistant Examiner* — Laura E Linhardt
(74) *Attorney, Agent, or Firm* — Oblon, McClelland, Maier & Neustadt, L.L.P.

(57) ABSTRACT

A vehicle travel assistance system includes distributing half of target yawing moment to inner wheels and distributing the rest to outer wheels; increasing the amount of increase in the braking force of the inner wheels as the target yawing moment distributed to the inner wheels increases, and increasing the amount of decrease in the braking force of the outer wheels as the target yawing moment distributed to the outer wheels increases; and causing the braking force of the inner wheels to increase according to the amount of increase in the braking force of the inner wheels, and causing the braking force of the outer wheels to decrease according to the amount of decrease in the braking force of the outer wheels.

18 Claims, 10 Drawing Sheets

(51) Int. Cl.
  *B60T 8/1755*   (2006.01)
  *B60L 3/10*     (2006.01)
  *B60L 7/26*     (2006.01)
  *B60W 30/09*    (2012.01)
  *B60W 40/109*   (2012.01)
  *B60T 7/12*     (2006.01)
  *B60W 10/06*    (2006.01)
  *B60W 10/188*   (2012.01)

(52) U.S. Cl.
  CPC ...... *B60T 8/17551* (2013.01); *B60T 8/17552* (2013.01); *B60W 10/06* (2013.01); *B60W 10/188* (2013.01); *B60W 30/09* (2013.01)

(56) References Cited

U.S. PATENT DOCUMENTS

| | | | |
|---|---|---|---|
| 10,023,230 B2* | 7/2018 | Sato | B60W 30/12 |
| 10,046,802 B2* | 8/2018 | Inoue | B60T 8/17557 |
| 2001/0020217 A1 | 9/2001 | Matsuno | |
| 2012/0226417 A1 | 9/2012 | Nishikawa | |
| 2015/0151749 A1 | 6/2015 | Tsuchiya et al. | |
| 2016/0023655 A1 | 1/2016 | Makino et al. | |

FOREIGN PATENT DOCUMENTS

| | | |
|---|---|---|
| JP | 2011-136617 A | 7/2011 |
| JP | 2014-201290 A | 10/2014 |
| JP | 2015-104996 A | 6/2015 |
| WO | WO 2011/128999 A1 | 10/2011 |

* cited by examiner

VEHICLE TRAVEL ASSISTANCE SYSTEM

CROSS-REFERENCE TO RELATED APPLICATIONS

This application is a United States national stage application of International Application No. PCT/JP2016/078922, filed Sep. 29, 2016, which designates the United States, and claims priority to Japanese Patent Application No. 2015-218704, filed Nov. 6, 2015, and the entire contents of each of the above applications are hereby incorporated herein by reference in entirety.

TECHNICAL FIELD

The present invention relates to a vehicle travel assistance system that adjusts a yawing motion of a traveling vehicle by controlling a difference in braking force between a left wheel and a right wheel.

BACKGROUND ART

As a vehicle travel assistance system for avoiding a collision between an obstacle ahead of the vehicle and the vehicle, there is known a system which executes a deceleration control for applying a braking force to decelerate a vehicle. However, even if the vehicle is decelerated by the execution of the deceleration control, in some cases, collision between the vehicle and the obstacle may not be avoided. Therefore, in such a travel assistance system, when it is determined that collision between the vehicle and the obstacle cannot be avoided even if the vehicle is decelerated by the execution of the deceleration control, a target travel route in a mode of avoiding the obstacle is generated to cause the vehicle to travel along the same target travel route.

In this manner, when the vehicle is caused to automatically travel along the target travel route, it is necessary to control the yawing moment of the vehicle and cause the vehicle to perform the yawing motion. Patent Document 1 describes a method of causing a vehicle to perform the yawing motion by controlling the difference in braking force between the left wheel and the right wheel. In this method, as the difference in braking force between the left wheel and the right wheel increases, the yawing moment of the vehicle increases.

CITATION LIST

Patent Document

Patent Document 1: JP-A-2015-104996

SUMMARY OF THE INVENTION

Technical Problem

Incidentally, in a case where the vehicle is caused to perform the yawing motion by generating a difference in braking force between the left wheel and the right wheel, the braking force applied to the vehicle, that is, the total of the braking force of each wheel changes, and there is a risk of increase in deviation between the vehicle deceleration and the requirement deceleration.

An object of the invention is to provide a vehicle travel assistance system capable of suppressing a deviation between a vehicle deceleration and a requirement deceleration, when generating a difference in braking force between a left wheel and a right wheel to cause a vehicle to perform a yawing motion.

Solution to Problem

The vehicle travel assistance system for solving the above problem is a system which controls a difference in braking force between a left wheel and a right wheel of the vehicle when causing the vehicle to perform a yawing motion on the basis of a set target yawing moment. In a case where a wheel located on an inner side at the time of the yawing motion of the vehicle is defined as an inner wheel, and a wheel located on an outer side is defined as the outer wheel, among the left wheel and the right wheel of the vehicle, the vehicle travel assistance system includes: a distribution unit which distributes half of the target yawing moment to the inner wheel and distributes the rest to the outer wheel; an increase and decrease amount computation unit which increases an amount of increase of the braking force of the inner wheel as the target yawing moment distributed to the inner wheel increases, and increases an amount of decrease in the braking force of the outer wheel as the target yawing moment distributed to the outer wheel increases; and a moment control unit which executes a moment control which increases the braking force of the inner wheel in accordance with the amount of increase of the braking force of the inner wheel set by the increase and decrease amount computation unit, and decreases the braking force of the outer wheel in accordance with the amount of decrease of the braking force of the outer wheel set by the increase and decrease amount computation unit.

According to the above configuration, since the target yawing moment set to cause the vehicle to perform the yawing motion is equally distributed to the inner wheel and the outer wheel, the magnitude of the amount of increase of the braking force of the inner wheel can be made equal to the magnitude of the amount of decrease of the braking force of the outer wheel. Further, in the moment control, the difference in braking force between the inner wheel and the outer wheel is controlled on the basis of such the amount of increase in braking force of the inner wheel and the amount of decrease of braking force of the outer wheel. As a result, it is possible to cause the vehicle to perform a desired yawing motion, while suppressing a change in the braking force applied to the vehicle, that is, a change in the total of the braking force of the respective wheels. Therefore, when the vehicle is caused to perform the yawing motion by generating the difference in braking force between the left wheel and the right wheel, it is possible to suppress the deviation between the vehicle deceleration and the requirement deceleration.

Further, the vehicle travel assistance system may include a deceleration control unit which executes a deceleration control for decelerating the vehicle by applying the braking force. In such deceleration control, the total of the braking forces of the respective wheels, that is, the braking force applied to the vehicle is set to a value corresponding to a target front-rear deceleration set by the deceleration control.

In the vehicle travel assistance system including the deceleration control unit, in the moment control executed together with the deceleration control, the braking force of the inner wheel may be made equal to a sum of the braking force applied to the inner wheel by the deceleration control and an amount of increase of the braking force of the inner wheel computed by the increase and decrease amount computation unit, and the braking force of the outer wheel may be made equal to a difference obtained by subtracting the amount of decrease of the braking force of the inner wheel computed by the increase and decrease amount computation unit from the braking force applied to the outer wheel by the deceleration control. According to this configuration, under the condition that the deceleration control is being performed, even if the distribution of the braking force to each wheel changes due to the execution of the moment control, the change in the braking force applied to the vehicle, that is, the change in the total of the braking forces of the respective wheels is suppressed. Therefore, it is possible to cause the vehicle to perform a desired yawing motion, while decelerating the vehicle with the target front-rear deceleration (requirement deceleration) which is set by the deceleration control.

Further, the vehicle travel assistance system may be adopted in a vehicle in which torque which is output from a power source of the vehicle is transmitted to both the left wheel and the right wheel via a differential. In this case, in the moment control when the difference obtained by subtracting the amount of decrease of the braking force of the outer wheel computed by the increase and decrease amount computation unit from the braking force applied to the outer wheel by the deceleration control is negative, the moment control unit preferably performs the following three processes:

stopping the application of the braking force to the outer wheel, increasing the torque output from the power source to increase the driving force of the outer wheel by an amount corresponding to the difference, and making the braking force of the inner wheel equal to a sum of the braking force applied to the inner wheel by the deceleration control, an amount of increase of the braking force of the inner wheel set by the increase and decrease amount computation unit, and an amount of increase of the driving force of the inner wheel due to the increase in the driving force of the outer wheel.

According to the above configuration, when the difference obtained by subtracting the amount of decrease of the braking force of the outer wheel computed by the increase and decrease amount computation unit from the braking force applied to the outer wheel by the deceleration control is negative, it is not possible to cause the vehicle to perform a desired yawing motion only by the change in the distribution of the braking force to each wheel. Therefore, when the difference is negative, in addition to change in the distribution of the braking force to each wheel, the driving force of the outer wheel is increased. When increasing the driving force of the outer wheel in this way, the driving force of the inner wheel also increases. However, the increase in the driving force of the inner wheel is canceled out by the increase in the braking force of the inner wheel. Therefore, not only by changing the distribution of the braking force to the respective wheels, but also by adjusting the driving force of the respective wheels, it is possible to cause the vehicle to perform a desired yawing motion, while decelerating the vehicle with the front-rear deceleration (requirement deceleration) which is set by the deceleration control.

Further, the moment control may be executed under the condition that the deceleration control is not being executed. In this case, in the moment control when the difference obtained by subtracting the amount of decrease of the braking force of the outer wheel computed by the increase and decrease amount computation unit from the braking force applied to the outer wheel before start of the moment control is negative, the moment control unit may perform all the following three processes:

stopping the application of the braking force to the outer wheel, increasing the torque output from the power source to increase the driving force of the outer wheel by an amount corresponding to the difference, and making the braking force of the inner wheel equal to a sum of the braking force applied to the inner wheel before start of the moment control, an amount of increase of the braking force of the inner wheel set by the increase and decrease amount computation unit, and an amount of increase of the driving force of the inner wheel with the increase in the driving force of the outer wheel.

According to the above configuration, in the case of executing the moment control under the condition that the deceleration control is not being executed, when the difference obtained by subtracting the amount of decrease of the braking force of the outer wheel computed by the increase and decrease amount computation unit from the braking force applied to the outer wheel before the start of the moment control is negative, not only the change in distribution of the braking force to each wheel, but also the driving force of each wheel is adjusted. This makes it possible to cause the vehicle to perform a desired yawing motion, while suppressing a change in the vehicle deceleration accompanying the execution of the moment control.

Incidentally, the deceleration control unit executes the deceleration control to avoid a collision between the vehicle and the obstacle when the obstacle is present in front of the vehicle, and the moment control unit executes the moment control together with the deceleration control.

In this case, the vehicle travel assistance system may be configured to include: a collision avoidance determination unit which determines whether or not the relative speed can be set to "0 (zero)" or less in front of the obstacle, on the basis of a relation between the relative speed of the vehicle based on the obstacle and a predicted value of the time until the relative speed becomes equal to "0 (zero)" by the execution of the deceleration control, when both the deceleration control and the moment control are executed; and a lateral slip determination unit which determines whether or not there is a wheel that is easy to skid on the basis of the braking force of the wheel, the driving force of the wheel, and the lateral acceleration of the vehicle. When it is possible to set the relative speed to "0 (zero)" or less in front of the obstacle, it is possible to determine that collision between the vehicle and the obstacle can be avoided by execution of the deceleration control without executing the moment control. Further, when it is determined that there is a wheel that is easy to skid, the wheels to which the braking force is applied by the deceleration control and the moment control skid, and the stability of the behavior of the vehicle may deteriorate.

In view of this, when the vehicle travel assistance system includes the collision avoidance determination unit and the lateral slip determination unit, the moment control unit determines that it is possible to set the relative speed to "0 (zero)" or less in front of the obstacle by the collision avoidance determination unit. Further, when it is determined that there is a wheel which is easy to skid by the lateral slip determination unit, it is preferable to increase and correct the braking force of the outer wheel. According to this configuration, when the relative speed can be set to "0 (zero)" or less in front of the obstacle, the braking force of the outer wheel is less likely to be decreased. As a result, the difference in braking force between the outer wheel and the inner wheel decreases, and the yawing moment of the vehicle decreases. As a result, the lateral force acting on the tire of the wheel becomes small, making it difficult for the wheel to easily slip. Therefore, it is possible to avoid collision between the vehicle and the obstacle, while suppressing deterioration of the stability of the vehicle behavior.

On the other hand, when it is not determined by the collision avoidance determination unit that the relative speed can be reduced to "0 (zero)" or less in front of the obstacle, and it is determined by the lateral slip determination unit that there are wheels that are easy to skid, the moment control unit preferably decreases and corrects the braking force of the outer wheel. According to this configuration, when it is not possible to make the relative speed equal to or less than "0 (zero)" in front of the obstacle, the braking force of the outer wheel is further decreased and the difference in braking force between the inner wheel and the outer wheel increases. As a result, the yawing moment of the vehicle further increases, which makes it possible to easily avoid collision between the vehicle and the obstacle by the yawing motion of the vehicle.

Incidentally, when the difference in braking force is generated between the inner wheel and the outer wheel due to the execution of the moment control, the steering wheel may be operated by the driver of the vehicle.

Thus, in a situation in which the direction of the yawing moment (hereinafter also referred to as a "steering moment") of the vehicle generated by the operation of the steering wheel of the vehicle is the same as the direction of the yawing moment (referred to as a "control moment") of the vehicle generated by the execution of the moment control, when the magnitude of the steering moment of the vehicle is equal to or less than the magnitude of the target yawing moment, the increase and decrease amount computation unit may decrease and correct both the amount of increase of the braking force of the inner wheel and the amount of decrease of the braking force of the outer wheel.

According to the above configuration, when the direction of the steering moment of the vehicle generated by the operation of the steering wheel by the driver is the same as the direction of the control moment, and the magnitude of the steering moment is equal to or smaller than the target yawing moment, both the amount of increase of the braking force of the inner wheel and the amount of decrease of the braking force of the outer wheel are decreased and corrected. As a result, the difference in braking force between the inner wheel and the outer wheel becomes small, and the control moment is hard to increase. Therefore, by the cooperation between the operation of the steering wheel by the driver and the moment control, it is possible to cause the vehicle to perform a desired yawing motion.

Further, in a situation in which the direction of the steering moment of the vehicle generated by the operation of the steering wheel of the vehicle is the same as the direction of the control moment of the vehicle generated by the execution of the moment control, when the magnitude of the steering moment is larger than the magnitude of the target yawing moment, the increase and decrease amount control unit does not execute the moment control.

According to the above configuration, when the direction of the steering moment of the vehicle generated by the operation of the steering wheel by the driver is the same as the direction of the control moment, and the magnitude of the steering moment is larger than the magnitude of the target moment, it is determined that it is possible to avoid collision between the vehicle and the obstacle by operation of the steering wheel by the driver. Therefore, in such a case, the moment control is not executed. Alternatively, the moment control being executed is terminated. Therefore, an event that an excessively large yawing moment occurs in the vehicle is hard to occur.

When the direction of the steering moment of the vehicle generated by the operation of the steering wheel of the vehicle is opposite to the direction of the steering moment of the vehicle generated by the execution of the moment control, the moment control unit may not execute the moment control.

According to the above configuration, when the direction of the steering moment of the vehicle generated by the operation of the steering wheel by the driver is opposite to the direction of the control moment, it is possible to determine that the rotational direction of the vehicle required by the driver is different from the rotational direction of the vehicle by execution of the moment control. Therefore, in such a case, the moment control is not executed. Alternatively, the moment control being executed is terminated. Therefore, it becomes possible to cause the vehicle to perform a yawing motion according to the driver's request.

BRIEF DESCRIPTION OF THE DRAWINGS

FIG. 13(a) is a timing chart illustrating a transition of the vehicle body speed of the vehicle, FIG. 13 (b) is a timing chart illustrating a transition of a target front-rear deceleration, FIG. 13(c) is a timing chart illustrating a transition of a target yawing moment, FIG. 13(d) is a timing chart illustrating a transition of the braking force and the driving force of a left front wheel, FIG. 13(e) is a timing chart illustrating a transition of the braking force and the driving force of a left rear wheel, FIG. 13(f) is a timing chart illustrating a transition of the braking force and the driving force of a right front wheel, and FIG. 13(g) is a timing chart illustrating a transition of the braking force and the driving force of a right rear wheel.

FIG. 15(a) is a timing chart illustrating a transition of the vehicle body speed of the vehicle, FIG. 15(b) is a timing chart illustrating a transition of a target front-rear deceleration, FIG. 15(c) is a timing chart illustrating a transition of the target yawing moment, FIG. 15(d) is a timing chart illustrating a transition of the braking force and the driving force of the left front wheel, FIG. 15(e) is a timing chart illustrating a transition of the braking force and the driving force of the left rear wheel, FIG. 15(f) is a timing chart illustrating a transition of the braking force and the driving force of the right front wheel, and FIG. 15(g) is a timing chart illustrating a transition of the braking force and the driving force of the right rear wheel.

MODE FOR CARRYING OUT THE INVENTION

First Embodiment

Hereinafter, a first embodiment of a vehicle travel assistance system will be described with reference to FIGS. 1 to 13.

Figure 1:
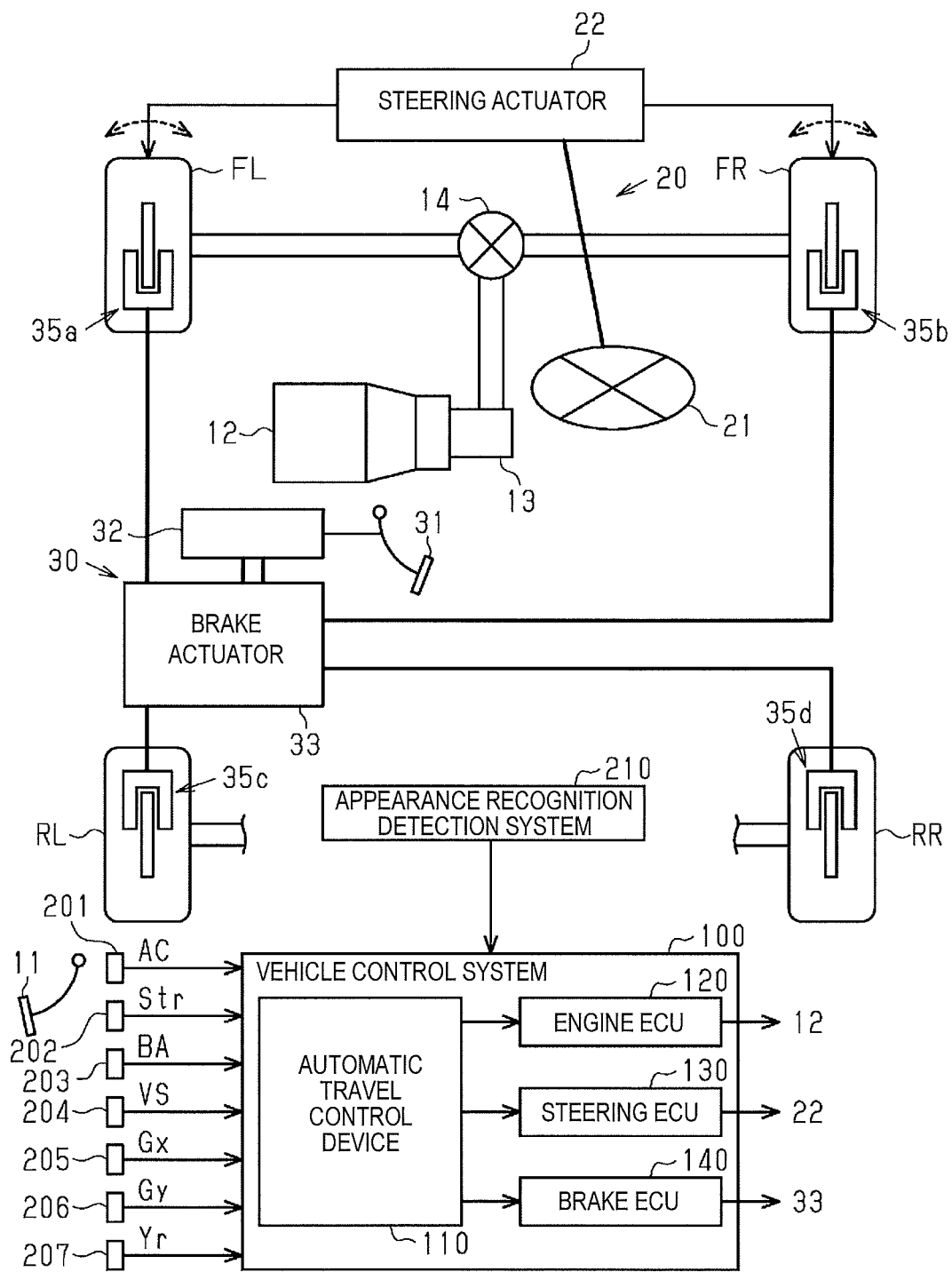
FIG. 1 is a configuration diagram schematically illustrating a vehicle control system including an automatic travel control device as a first embodiment of a vehicle travel assistance system, and a vehicle including the vehicle control system.

FIG. 1 illustrates a vehicle control system 100 equipped with an automatic travel control device 110 that is a vehicle travel assistance system of the embodiment, and a vehicle equipped with the vehicle control system 100. As illustrated in FIG. 1, the vehicle is a front wheel drive vehicle, a left front wheel FL and a right front wheel FR function as driving wheels, and a left rear wheel RL and a right rear wheel RR function as driven wheels. Further, the vehicle is equipped with an engine 12 as an example of a power source that outputs a drive torque according to the operation amount of an accelerator pedal 11 by the driver, and a speed change gear 13 in which a speed change ratio is changed in accordance with the vehicle body speed of the vehicle or the rotational speed of the engine 12. Further, the drive torque which is output from the speed change gear 13 is transmitted to the front wheels FL and FR through a differential 14.

A steering device 20 of the vehicle has a steering actuator 22 that adjusts the steering angle of the front wheels FL and FR also functioning as steering wheels in accordance with the operation of the steering wheel 21 provided by the driver. The steering actuator 22 is provided with an assist motor that assists the operation of the steering wheel 21 provided by the driver.

A braking device 30 of the vehicle has a hydraulic pressure generator 32 for generating a hydraulic pressure according to the operating force of the brake pedal 31 provided by the driver, and a brake actuator 33 capable of individually adjusting the braking forces of the respective wheels FL, FR, RL, and RR. Further, the vehicle is provided with brake mechanisms 35a, 35b, 35c, and 35d individually corresponding to the respective wheels FL, FR, RL, and RR. When the driver operates the brake pedal 31, the brake fluid in an amount corresponding to the hydraulic pressure generated by the hydraulic pressure generator 32 is supplied into the cylinders of the respective brake mechanisms 35a to 35d, and the respective brake mechanisms 35a to 35d apply the braking force corresponding to the hydraulic pressure generated in the cylinders to the wheels FL, FR, RL, and RR. Further, when the brake actuator 33 is operating, the hydraulic pressure in the cylinders of the respective brake mechanisms 35a to 35d is adjusted by the brake actuator 33. As a result, the respective brake mechanisms 35a to 35d can apply the braking force corresponding to the hydraulic pressure generated in the cylinders to the wheels FL, FR, RL, and RR.

Further, as illustrated in FIG. 1, an accelerator operation amount sensor 201, a steering sensor 202, a brake operation amount sensor 203, a vehicle body speed sensor 204, a front-rear acceleration sensor 205, a lateral acceleration sensor 206, and a yaw rate sensor 207 are electrically connected to the vehicle control system 100. The accelerator operation amount sensor 201 detects an accelerator operation amount AC which is the operation amount of the accelerator pedal 11, and the steering sensor 202 detects a steering angle Str of the steering wheel 21. The brake operation amount sensor 203 detects a brake operation amount BA which is the operation amount of the brake pedal 31. The vehicle body speed sensor 204 is a detection system which detects a vehicle body speed VS of the vehicle, and, for example, can be configured to include a sensor which detects the wheel speed which is the rotational speed of the wheels FL, FR, RL, and RR. The front-rear acceleration sensor 205 detects front-rear acceleration Gx which is the acceleration of the vehicle in a front-rear direction, and the lateral acceleration sensor 206 detects a lateral acceleration Gy which is the acceleration of the vehicle in a lateral direction. The yaw rate sensor 207 detects a yaw rate Yr of the vehicle.

Further, the vehicle control system 100 is also electrically connected to an appearance recognition detection system 210 that monitors the surrounding conditions of the vehicle and outputs information obtained by the monitoring. The appearance recognition detection system 210 is configured to include an imaging device such as a camera, a millimeter wave radar, and the like. For example, the appearance recognition detection system 210 can detect the determination as to whether or not an obstacle (other vehicle, pedestrian, guardrail, etc.) exists in front of the vehicle, a distance between the vehicle and the obstacle, and the relative speed of the vehicle based on the obstacle. Further, such information is output to the vehicle control system 100.

Further, the vehicle control system 100 has an engine ECU 120 which controls the engine 12, a steering ECU 130 which controls the steering actuator 22, a brake ECU 140 which controls the brake actuator 33, and an automatic travel control device 110 for assisting the automatic traveling of the vehicle. Examples of assist control executed by the automatic travel control device 110 can include, for example, adaptive cruise control (hereinafter referred to as "ACC"), a pre-crash safety system (hereinafter referred to as "PCS"), and a lane keep assist (hereinafter referred to as "LKA").

Here, an overview of the case of executing PCS will be described.

When information indicating that an obstacle is present in front of the vehicle is input from the appearance recognition detection system 210, it is determined whether there is a possibility of collision between the vehicle and the obstacle. When it is determined that there is a possibility of collision of the vehicle with the obstacle, by activating the brake actuator 33, a braking force is applied to the vehicle, that is, a braking force is applied to each of the wheels FL, FR, RL, and RR of the vehicle, and deceleration control for decelerating the vehicle is executed.

When the deceleration control is being executed, it is determined whether or not the vehicle can be stopped before the obstacle by executing the deceleration control, that is, whether the relative speed Vr can be set to "0 (zero)" or less before the obstacle. Further, when it is determined that the relative speed Vr can be set to "0 (zero)" or less before the obstacle, it is determined that collision between the vehicle and the obstacle can be avoided, and a moment control to be described later is not executed. On the other hand, when it is determined that the relative speed Vr of the vehicle cannot be set to "0 (zero)" or less before the obstacle, since there is a possibility that collision between the vehicle and the obstacle cannot be avoided merely by decelerating the vehicle through execution of the deceleration control, the moment control is executed.

The moment control executed by the automatic travel control device 110 according to the embodiment is a control for causing the vehicle to perform a yawing motion by generating a difference in braking force between the left wheels FL and RL and the right wheels FR and RR. Specifically, prior to the execution of the moment control, a target yawing moment MRq for avoiding an obstacle is set, and the braking forces of the respective wheels FL, FR, RL, and RR are set in accordance with the target yawing moment MRq. That is, in this specification, when controlling the yawing motion of the vehicle on the basis of the set target yawing moment MRq, the brake actuator 33 is operated on the basis of the braking force BP for each of the wheels FL, FR, RL, and RR which is set by the automatic travel control device 110. As a result, a difference in braking force corresponding to the target yawing moment MRq occurs between the left wheel FL and RL and the right wheels FR and RR of the vehicle. As a result, it is possible to cause the vehicle, which is decelerated by the execution of the deceleration control, to perform a yawing motion, that is, an avoidance motion in a manner of avoiding the obstacles.

Next, a processing routine executed by the automatic travel control device 110 to avoid collision between the vehicle and the obstacle will be described with reference to the flowchart illustrated in FIG. 2 and the diagram illustrated in FIG. 3. Further, the processing routine illustrated in FIG. 2 is a processing routine executed for each preset control cycle when information indicating that an obstacle is present in front of the vehicle is input from the appearance recognition detection system 210.

Figure 2:
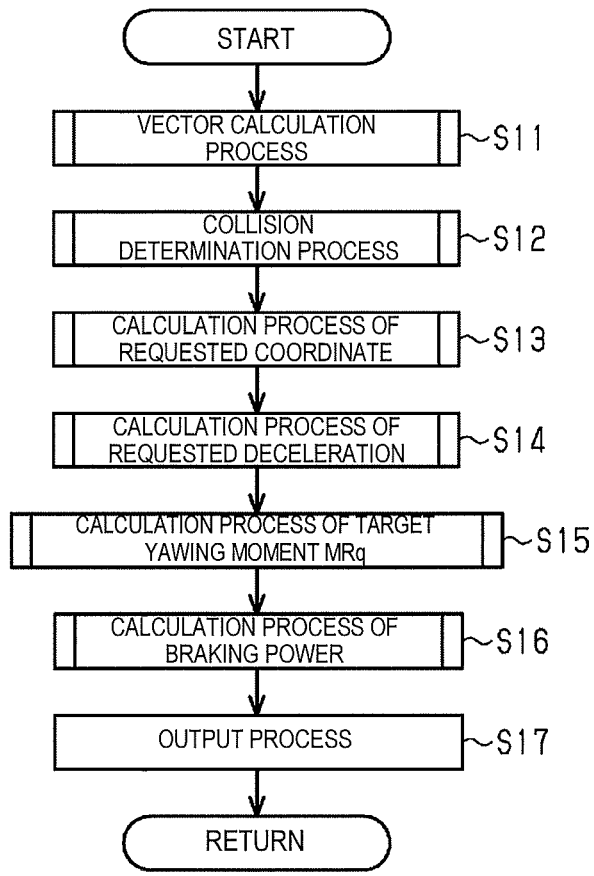
FIG. 2 is a flowchart illustrating a processing routine executed when an obstacle is present in front of the vehicle in the vehicle travel assistance system according to the first embodiment.
Figure 3:
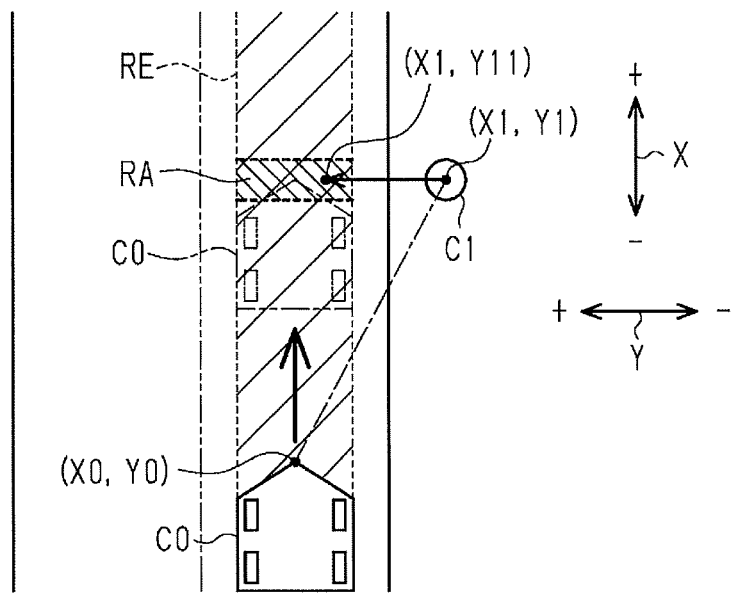
FIG. 3 is a schematic diagram illustrating a state in which an obstacle is present in front of the vehicle in the vehicle travel assistance system according to the first embodiment.

As illustrated in FIG. 2, in this processing routine, the automatic travel control device 110 performs a vector computing process (step S11). That is, as illustrated in FIG. 3, the automatic travel control device 110 computes the relative position (X1 and Y1) of the obstacle C1 on the basis of the current position (X0 and Y0) of the vehicle C0. "X1" is a relative position in the front-rear direction of the obstacle C1 at the current time, and "Y1" is a relative position in the lateral direction of the obstacle C1 at the current time. Further, the automatic travel control device 110 predicts the movement direction of the obstacle C1, which is a direction indicated by an arrow in FIG. 3, and the moving speed of the obstacle C1. Subsequently, the automatic travel control device 110 obtains a predicted travel route RE of the vehicle C0, on the basis of the vehicle body speed VS, the front-rear acceleration Gx, and the lateral acceleration Gy of the current time of the vehicle C0. Further, in the predicted travel route RE of the vehicle C0, the automatic travel control device 110 specifies an overlapping region RA which is a region overlapping the predicted travel route of the obstacle C1. After that, the automatic travel control device 110 shifts the processing to the next step S12.

Returning to FIG. 2, in step S12, the automatic travel control device 110 executes the collision determination process which determines whether there is a possibility of collision of the vehicle C0 with the obstacle C1, using the result of the computing process in step S11. The specific content of the collision determination process will be described later with reference to FIG. 4. Subsequently, the automatic travel control device 110 executes the computing process of requirement coordinates for determining a target position for avoiding collision with the obstacle C1 (step S13) The specific contents of the computing process of the requirement coordinate will be described later with reference to FIG. 5. Further, the automatic travel control device 110 executes the computing process of the requirement deceleration which computes the deceleration of the vehicle C0 necessary to avoid a collision with the obstacle C1, that is, a target front-rear deceleration Axtgt and a target lateral deceleration Aytgt of the vehicle C0 (step S14). The specific content of the requirement deceleration computing process will be described later with reference to FIG. 6.

Subsequently, the automatic travel control device 110 executes the computing process of the target yawing moment MRq to be described later using FIG. 7 (step S15). Further, the automatic travel control device 110 executes the computing process of the braking force of each of the wheels FL, FR, RL, and RR and the braking and driving force for setting the amount of increase of the driving force of the front wheels FL and FR which are drive wheels, using the target front-rear deceleration Axtgt computed in step S14 and the target yawing moment MRq computed in step S15 (step S16). The specific contents of the computing process of the braking and driving force will be described later using FIG. 8.

Subsequently, the automatic travel control device 110 executes an output process of outputting to the brake ECU 140 information specifying the control amount computed in the processing of step S16, that is, the braking force BP of each of the wheels FL, FR, RL, and RR (step S17). Thereafter, the automatic travel control device 110 temporarily terminates this processing routine. When the above information is input to the brake ECU 140 as described above, the brake ECU 140 controls the operation of the brake actuator 33 so that the braking force applied to each of the wheels FL, FR, RL, and RR becomes the braking force BP which is set by the automatic travel control device 110.

Next, the collision determination process (processing routine) of step S12 will be described with reference to the flowchart illustrated in FIG. 4.

Figure 4:
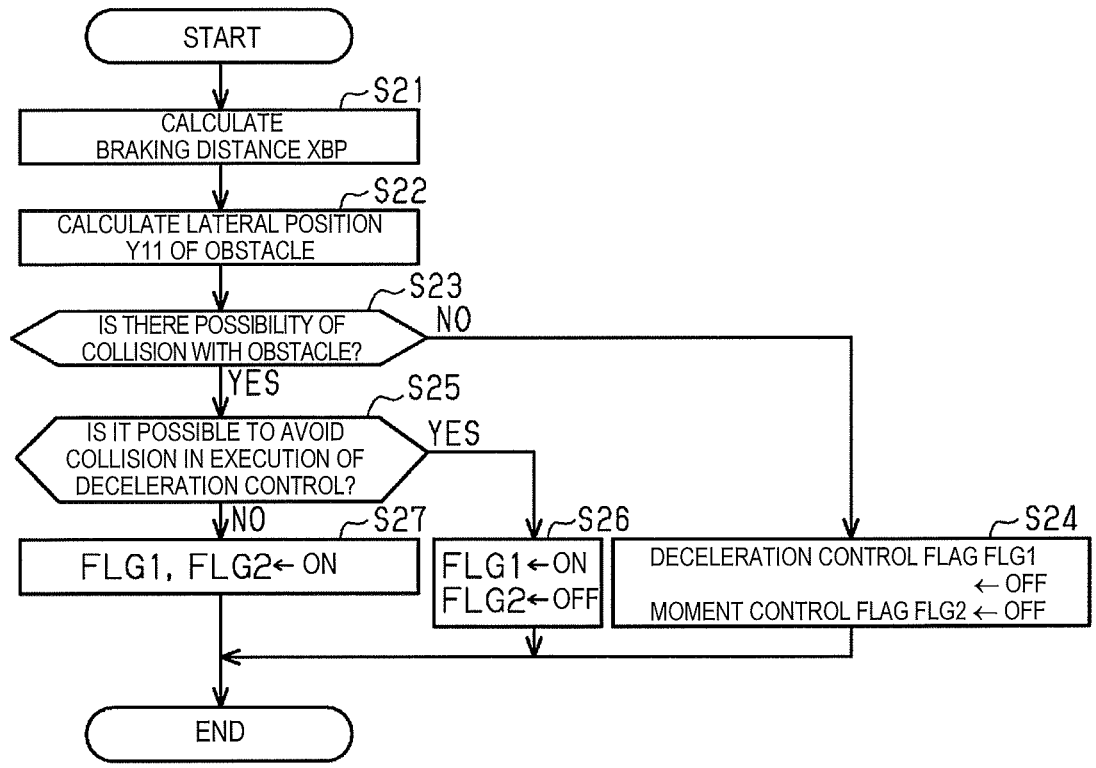
FIG. 4 is a flowchart illustrating a processing routine executed for determining whether there is a possibility of collision of the vehicle with an obstacle in the vehicle travel assistance system of the first embodiment.

As illustrated in FIG. 4, the automatic travel control device 110 computes a braking distance XBP, which is a distance required until the vehicle C0 stops, on the assumption that the deceleration control has been started from the current time (step S21). The braking distance XBP can be computed on the basis of the vehicle body speed VS of the vehicle C0 of the current time and the target front-rear deceleration of deceleration control. Subsequently, under the assumption that the vehicle body speed VS of the current time of the vehicle is maintained, the automatic travel control device 110 computes a time zone in which the vehicle C0 is located in the overlapping region RA, and the lateral position Y11 of the obstacle C1 in the same time zone (step S22). Further, the automatic travel control device 110 determines whether there is a possibility of collision between the obstacle C1 and the vehicle C0 (step S23). For example, as illustrated in FIG. 3, when the lateral position Y11 of the obstacle C1 obtained in step S22 is included in the overlapping region RA, the automatic travel control device 110 can predict that there is a possibility of collision between the obstacle C1 and the vehicle C0. On the other hand, when the lateral position Y11 of the obstacle C1 is not included in the overlapping region RA, the automatic travel control device 110 does not determine that there is a possibility of collision between the obstacle C1 and the vehicle C0.

Returning to FIG. 4, when it is not determined that there is a possibility of collision (step S23: NO), the automatic travel control device 110 sets both a deceleration control flag FLG1 and a moment control flag FLG2 to OFF (step S24). The deceleration control flag FLG1 is a flag for determining whether to execute the deceleration control. That is, when the deceleration control flag FLG1 is set to ON, the deceleration control is executed, and meanwhile, when the deceleration control flag FLG1 is set to OFF, the deceleration control is not executed. Further, the moment control flag FLG2 is a flag for determining whether to execute the moment control. That is, when the moment control flag FLG2 is set to ON, the moment control is executed, and meanwhile, when the moment control flag FLG2 is set to OFF, the moment control is not executed. After that, the automatic travel control device 110 terminates the processing routine.

On the other hand, when it is determined that there is a possibility of collision (step S23: YES), the automatic travel control device 110 determines whether the collision between the obstacle C1 and the vehicle C0 can be avoided by executing the deceleration control from the current time (step S25). For example, when the braking distance XBP obtained in step S21 is less than a linear distance from the current position (X0, Y0) of the vehicle C0 to the overlapping region RA, the automatic travel control device 110 can determine that the collision between the obstacle C1 and the vehicle C0 can be avoided, by executing the deceleration control. On the other hand, when the braking distance XBP is equal to or more than the linear distance from the current position (X0, Y0) of the vehicle C0 to the overlapping region RA, the automatic travel control device 110 can determine that there is a possibility that a collision between the obstacle C1 and the vehicle C0 cannot be avoided, even when executing the deceleration control.

When it is determined that collision can be avoided (step S25: YES), the automatic travel control device 110 sets the deceleration control flag FLG1 to ON and sets the moment control flag FLG2 to OFF (step S26). After that, the automatic travel control device 110 terminates this processing routine.

On the other hand, when it is not determined that collision can be avoided (step S25: NO), the automatic travel control device 110 sets both the deceleration control flag FLG1 and the moment control flag FLG2 to ON (step S27). The deceleration control flag FLG1 may have already been set to ON before the determination result of step S25 becomes "YES", that is, the deceleration control may be in progress. In this case, in step S27, the moment control flag FLG2 is set to ON, while keeping the deceleration control flag FLG1 to ON. After that, the automatic travel control device 110 terminates the processing routine.

Next, the computing process (processing routine) of the requirement coordinates of step S13 will be described with reference to the flowchart illustrated in FIG. 5.

Figure 5:
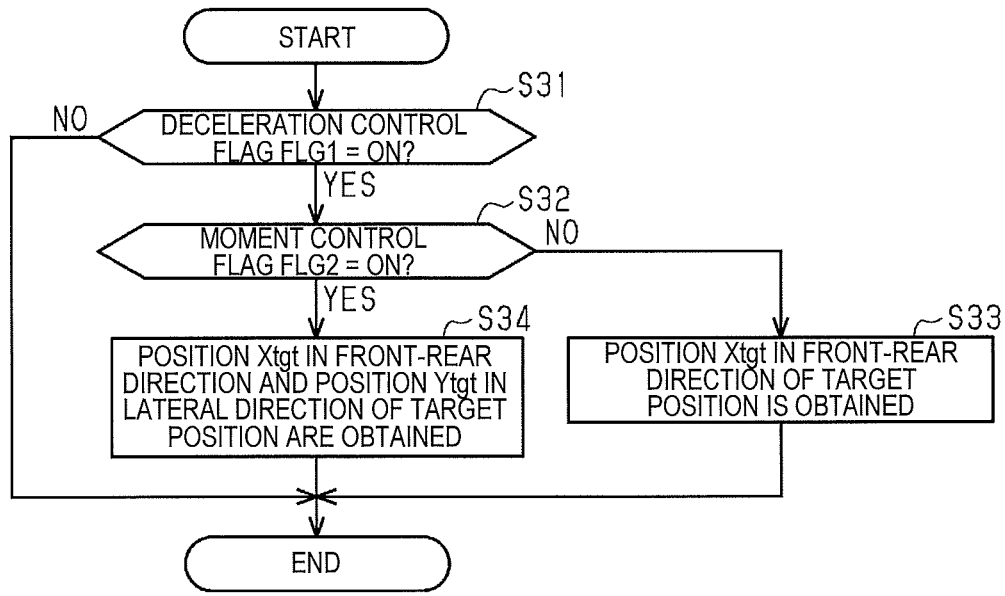
FIG. 5 is a flowchart illustrating a processing routine executed for setting a target position of the vehicle when executing at least one of the deceleration control and the moment control in the vehicle travel assistance system according to the first embodiment.

As illustrated in FIG. 5, the automatic travel control device 110 determines whether or not the deceleration control flag FLG1 is set to ON (step S31). When the deceleration control flag FLG1 is set to OFF (step S31: NO), the automatic travel control device 110 terminates this processing routine. On the other hand, when the deceleration control flag FLG1 is set to ON (step S31: YES), the automatic travel control device 110 determines whether or not the moment control flag FLG2 is set to ON (step S32). When the moment control flag FLG2 is set to OFF (step S32: NO), the automatic travel control device 110 obtains the position Xtgt in the front-rear direction of the target position on the basis of the current position (X0, Y0) of the vehicle (step S33). The position Xtgt in the front-rear direction of the target position of this case can be set to a position of the vehicle C0 at the time when the vehicle body speed VS becomes equal to "0 (zero)" by the execution of the deceleration control. After that, the automatic travel control device 110 terminates this processing routine.

On the other hand, when the moment control flag FLG2 is set to ON (step S32: YES), the automatic travel control device 110 obtains the position Xtgt in the front-rear direction of the target position and the lateral position Ytgt on the basis of the current position (X0, Y0) of the vehicle (step S34). In this case, the target positions (Xtgt, Ytgt) are set to the positions at which the obstacle C1 entering the overlapping region RA can be avoided. After that, the automatic travel control device 110 terminates this processing routine.

Next, the computing process (processing routine) of the requirement deceleration of step S14 will be described with reference to the flowchart illustrated in FIG. 6.

Figure 6:
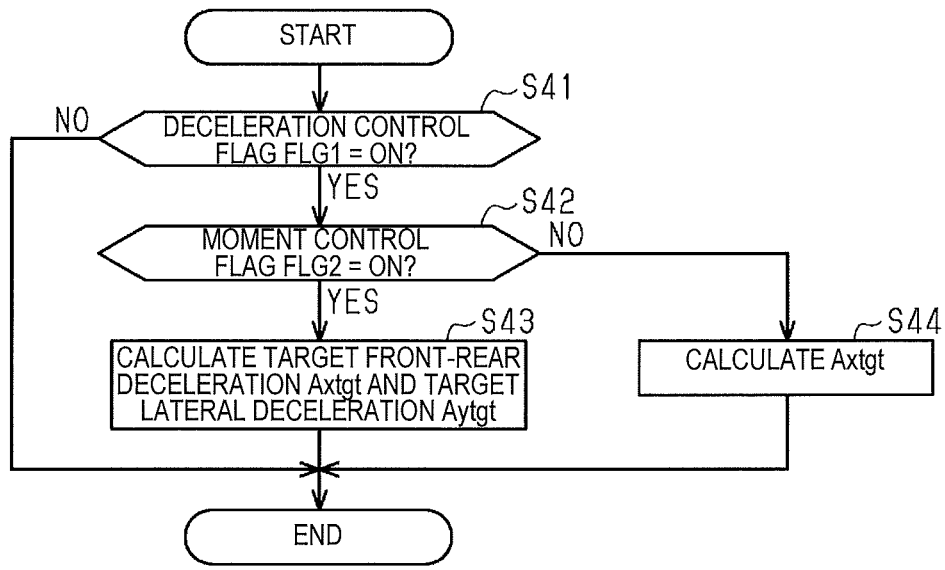
FIG. 6 is a flowchart illustrating a processing routine executed for setting a target deceleration when executing at least one of the deceleration control and the moment control in the vehicle travel assistance system of the first embodiment.

As illustrated in FIG. 6, the automatic travel control device 110 determines whether or not the deceleration control flag FLG1 is set to ON (step S41). When the deceleration control flag FLG1 is set to OFF (step S41: NO), the automatic travel control device 110 terminates this processing routine. On the other hand, when the deceleration control flag FLG1 is set to ON (step S41: YES), the automatic travel control device 110 determines whether or not the moment control flag FLG2 is set to ON (step S42). When the moment control flag FLG2 is set to ON (step S42: YES), the automatic travel control device 110 computes the target front-rear deceleration Axtgt and the target lateral deceleration Aytgt, on the basis of the target positions (Xtgt, Ytgt) obtained in the above step S34, the vehicle body speed VS of the vehicle, and the relative speed Vr (step S43). After that, the automatic travel control device 110 terminates this processing routine.

On the other hand, when the moment control flag FLG2 is set to OFF (step S42: NO), the automatic travel control device 110 computes the target front-rear deceleration Axtgt, on the basis of the position Xtgt in the front-rear direction of the target position obtained in the step S33, the vehicle body speed VS of the vehicle C0, the relative speed Vr and the like (step S44). After that, the automatic travel control device 110 terminates this processing routine.

Next, the computing process (processing routine) of the target yawing moment MRq in step S15 will be described with reference to the flowchart illustrated in FIG. 7.

Figure 7:
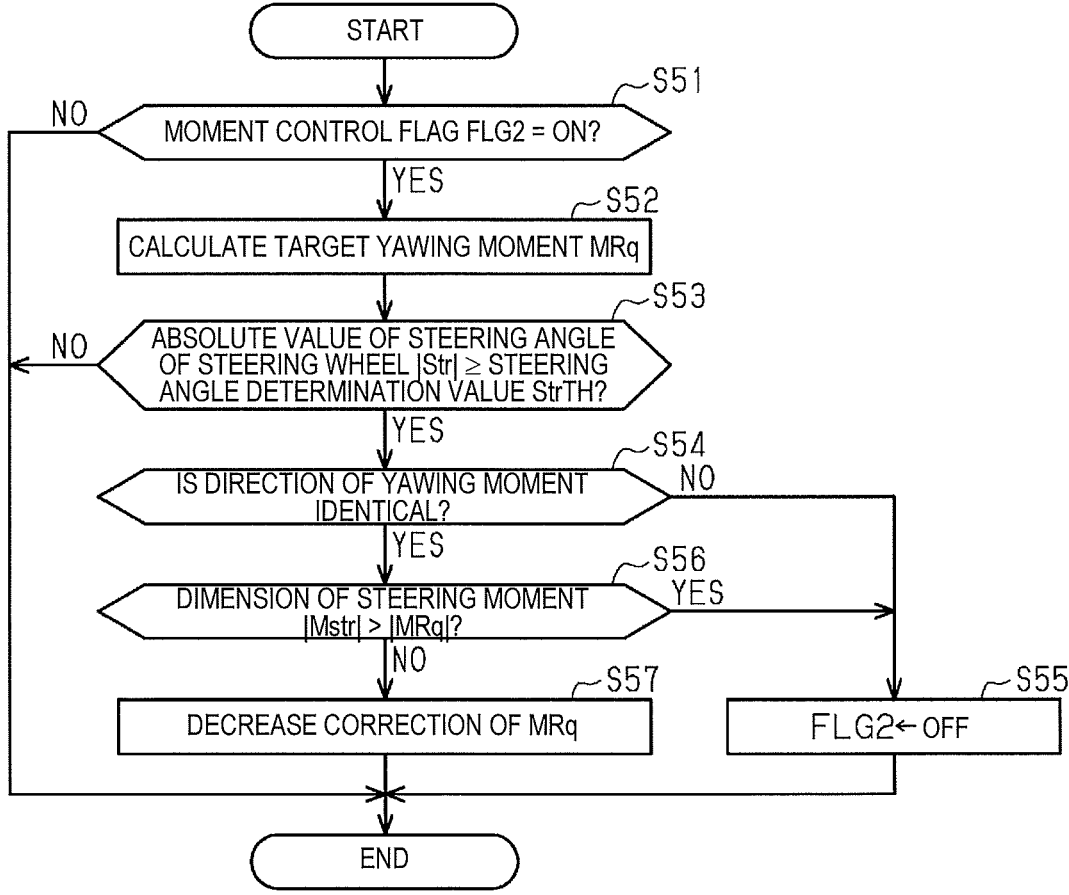
FIG. 7 is a flowchart illustrating a processing routine executed for setting a target yawing moment when executing a moment control in the vehicle travel assistance system of the first embodiment.

As illustrated in FIG. 7, the automatic travel control device 110 determines whether the moment control flag FLG2 is set to ON (step S51). When the moment control flag FLG2 is set to OFF (step S51: NO), the automatic travel control device 110 terminates this processing routine. On the other hand, when the moment control flag FLG2 is set to ON (step S51: YES), the automatic travel control device 110 computes the target yawing moment MRq on the basis of the target lateral deceleration Aytgt computed in the above step S43 (step S52). For example, as the absolute value of the target lateral deceleration Aytgt is large, the target yawing moment MRq is set to a larger value.

Subsequently, the automatic travel control device 110 acquires a steering angle Str of the steering wheel 21, and determines whether or not the absolute value |Str| of the steering angle is equal to or larger than a steering determination angle StrTH (step S53). The steering determination angle StrTH is a determination value for determining whether or not a driver performs steering to avoid collision between the vehicle C0 and the obstacle C1. Therefore, when the absolute value |Str| of the steering angle is equal to or greater than the steering determination angle StrTH, it is possible to determine that the steering is being performed. Further, when the absolute value |Str| of the steering angle is less than the steering determination angle StrTH, it is possible to determine that steering is not performed. The steering determination angle StrTH may be a predetermined fixed value or may be set to a larger value as the magnitude of the target yawing moment MRq is larger.

Further, when the absolute value |Str| of the steering angle is less than the steering determination angle StrTH (step S53: NO), the automatic travel control device 110 terminates this processing routine. On the other hand, when the absolute value |Str| of the steering angle is equal to or greater than the steering determination angle StrTH (step S53: YES), the automatic travel control device 110 shifts the processing to the next step S54. The yawing moment generated by the moment control is referred to as a "control moment", and the yawing moment generated by the steering is referred to as a "steering moment". In this case, in step S54, the automatic travel control device 110 determines whether the direction of the control moment (that is, the direction in which the vehicle is rotated) is the same as the direction of the steering moment. In a case where the direction of the control moment is not the same as the direction of the steering moment, it is possible to determine that the direction in which the driver desires to rotate the vehicle C0 is opposite to the direction in which the driver desires to rotate the vehicle C0 by the moment control.

Therefore, when the direction of the control moment is not the same as the direction of the steering moment (step S54: NO), the automatic travel control device 110 sets the moment control flag FLG2 to OFF (step S55). After that, the automatic travel control device 110 terminates this processing routine. That is, when the direction of the control moment is opposite to the direction of the steering moment, the moment control is not executed, or the executed moment control is terminated.

On the other hand, when the direction of the control moment is the same as the direction of the steering moment (step S54: YES), the automatic travel control device 110 computes the steering moment Mstr, and determines whether the absolute value |Mstr| of the steering moment is larger than the absolute value |MRq| of the target yawing moment (step S56). As the absolute value of the lateral deceleration of the vehicle C0 generated by steering increases, the steering moment Mstr increases. Further, the lateral deceleration of the vehicle C0 generated by the steering can be computed on the basis of the vehicle body speed VS and the steering angle Str of the vehicle.

When the absolute value |Mstr| of the steering moment is larger than the absolute value |MRq| of the target yawing moment, even if the yawing moment is not increased by execution of the moment control, it is possible to determine that the collision between the vehicle C0 and the obstacle C1 can be avoided by the steering of the driver. Therefore, if the moment control is executed while performing such steering, the yawing moment (that is, the sum of the steering moment and the control moment) of the vehicle C0 becomes excessive, and there is a risk of an increase in deviation between the behavior of the vehicle C0 required by the driver who performs the steering and the actual behavior of the vehicle C0.

Therefore, when the absolute value |Mstr| of the steering moment is larger than the absolute value |MRq| of the target yawing moment (step S56: YES), the automatic travel control device 110 shifts the process to the aforementioned step S55. In this case, since the moment control flag FLG2 is set to OFF, the moment control is not executed, or the executed moment control is terminated.

On the other hand, when the absolute value |Mstr| of the steering moment is equal to or less than the absolute value |MRq| of the target yawing moment, the actual travel route of the vehicle C0 can be brought closer to the target travel route for avoiding the collision between the vehicle C0 and the obstacle C1 by the driver's steering. However, it is possible to determine that the yawing moment of the vehicle is still small in order to make the actual travel route of the vehicle C0 coincide with the target travel route. However, when the moment control is executed on the basis of the target yawing moment MRq obtained in step S52, there is a risk of excessive control. Therefore, when the absolute value |Mstr| of the steering moment is equal to or less than the absolute value |MRq| of the target yawing moment (step S56: NO), the automatic travel control device 110 performs a decrease correction of the target yawing moment MRq obtained in the above step S52 (step S57). For example, as the difference between the target yawing moment MRq and the steering moment Mstr before the decrease correction is small, the target yawing moment MRq decreases. After that, the automatic travel control device 110 terminates this processing routine.

Next, the computing process (processing routine) of the braking and driving force at step S16 will be described with reference to the flowchart illustrated in FIG. 8 and the diagram illustrated in FIG. 9.

Figure 8:
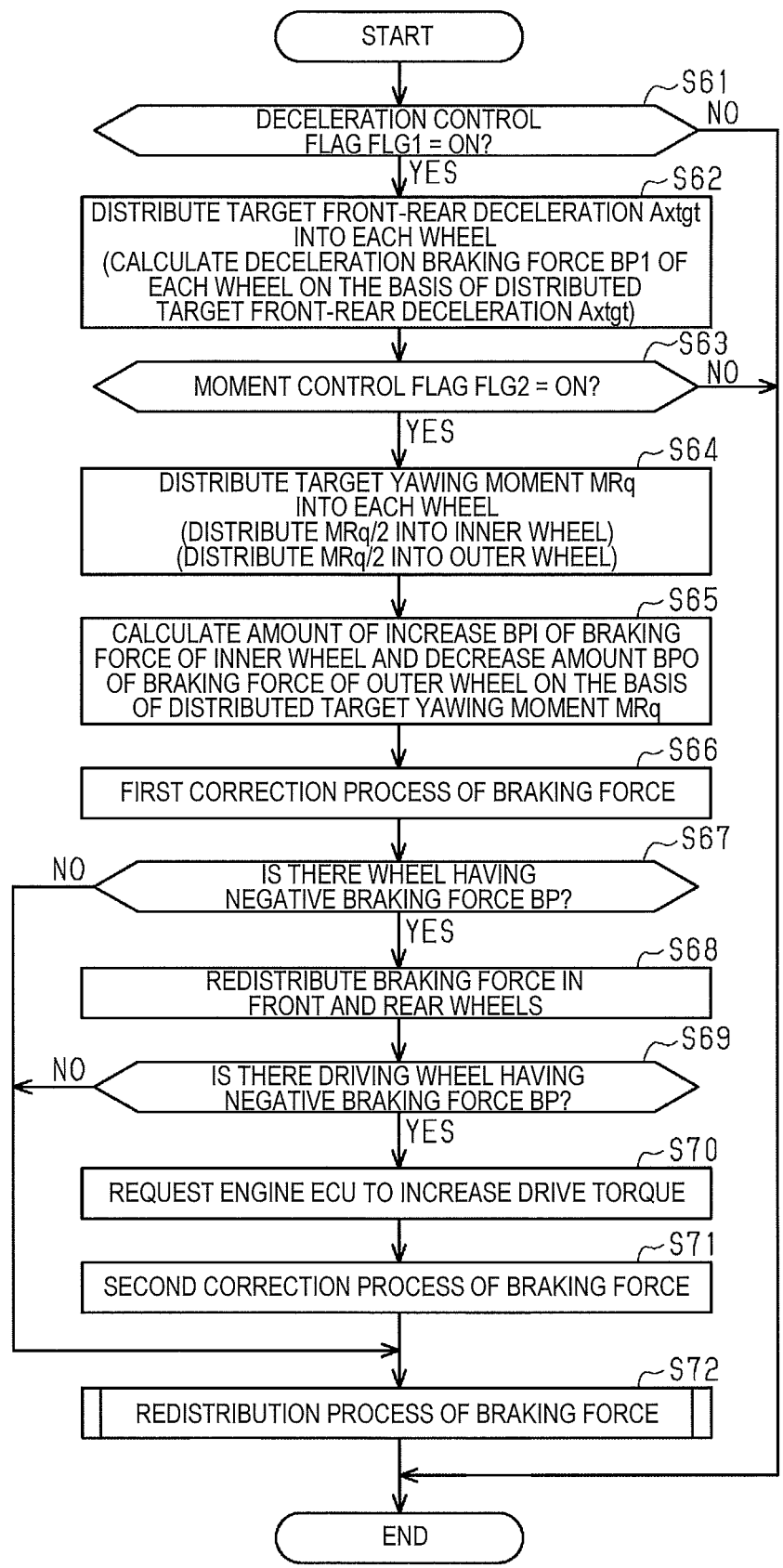
FIG. 8 is a flowchart illustrating the processing contents of the deceleration control and the moment control in the vehicle travel assistance system of the first embodiment.

As illustrated in FIG. 8, the automatic travel control device 110 determines whether or not the deceleration control flag FLG1 is set to ON (step S61). When the deceleration control flag FLG1 is set to OFF, both the execution of the deceleration control and the execution of the moment control are not permitted. Therefore, when the deceleration control flag FLG1 is set to OFF (step S61: NO), the automatic travel control device 110 terminates this processing routine.

On the other hand, when the deceleration control flag FLG1 is set to ON (step S61: YES), the automatic travel control device 110 distributes the target front-rear deceleration Axtgt computed in the above step S43 or S44 to each of the wheels FL, FR, RL, and RR (step S62). Further, the automatic travel control device 110 sets the deceleration braking force BP1, which is the braking force applied to the wheels FL, FR, RL, and RR by execution of the deceleration control, to a value corresponding to the distributed target front-rear deceleration Axtgt. That is, in this specification, the deceleration control is executed by executing the step S62. In this respect, an example of the "deceleration control unit" that executes the deceleration control for decelerating the vehicle by applying the braking force with the automatic travel control device 110 is configured. When the vehicle decelerates due to the application of the braking force, the ground loads of the front wheels FL and FR gradually increase. Therefore, when the vehicle decelerates due to the execution of the deceleration control, as the ground load of the front wheels FL and FR increases, the target front-rear deceleration Axtgt distributed to the front wheels FL and FR may be increased in step S62.

Subsequently, the automatic travel control device 110 determines whether or not the moment control flag FLG2 is set to ON (step S63). When the moment control flag FLG2 is set to OFF (step S63: NO), the automatic travel control device 110 terminates this processing routine. On the other hand, when the moment control flag FLG2 is set to ON (step S63: YES), the automatic travel control device 110 distributes the target yawing moment MRq computed in the above step S15 to the respective wheels FL, FR, RL, and RR (step S64). Among the left wheels FL and RL and the right wheels FR and RR of the vehicle, the wheels located inside at the time of yawing motion of the vehicle are assumed as the inner wheels, and the wheels located outside are assumed as the outer wheels. In this case, the automatic travel control device 110 distributes the inner target yawing moment MRqI (=MRq/2), which is half of the target yawing moment MRq, to the inner wheel, and distributes the remaining outer target yawing moment MRqO (=MRq/2) to the outer wheel. Therefore, in the present specification, the automatic travel control device 110 functions as an example of "distribution unit".

Further, in step S64, the automatic travel control device 110 distributes the inner target yawing moment MRqI, which is distributed to the inner wheels (for example, the left wheel FL and RL), to the inner front wheel (for example, a left front wheel FL) and the inner rear wheel (for example, a left rear wheel RL). Similarly, the automatic travel control device 110 distributes the outer target yawing moment MRqO, which is distributed to the outer wheels (for example, the right wheels FR and RR), to the outer front wheel (for example, a right front wheel FR) and the outer rear wheel (for example, a right rear wheel RR).

Figure 9:
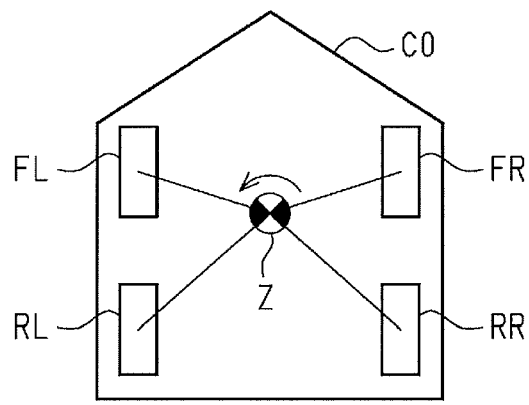
FIG. 9 is a schematic diagram illustrating a positional relation between the center of gravity of a vehicle and each wheel in the vehicle provided with the vehicle travel assistance system according to the first embodiment.

Here, as illustrated in FIG. 9, since the center of gravity Z of the vehicle is located on the front side of the vehicle, the rear wheels RL and RR are separated from the center of gravity Z than the front wheels FL and FR. Therefore, in a case where the braking force to the rear wheels RL and RR is changed by a predetermined amount, the yawing moment of the vehicle can be made larger than the case where the braking force to the front wheels FR and FL is changed by a predetermined amount. Therefore, the automatic travel control device 110 sets the amount of distribution of the inner target yawing moment MRqI to the inner rear wheel to be larger than the amount of distribution of the inner target yawing moment MRqI to the inner front wheel. Likewise, the automatic travel control device 110 sets the amount of distribution of the outer target yawing moment MRqO to the outer rear wheel to be larger than the amount of distribution of the outer target yawing moment MRqO to the outer front wheel. However, a ratio of the amount of distribution of the inner target yawing moment MRqI to the inner rear wheel with respect to the amount of distribution of the inner target yawing moment MRqI to the inner front wheel is referred to as a "distribution ratio for the inner wheel". Further, a ratio of the amount of distribution of the outer target yawing moment MRqO to the outer rear wheel with respect to the amount of distribution of the outer target yawing moment MRqO to the outer front wheel is referred to as a "distribution ratio for the outer wheel". In this case, the distribution ratio for the inner wheel is equal to the distribution ratio for the outer wheel.

Returning to FIG. 8, the automatic travel control device 110, which has executed step S64, computes an amount of increase BPI of the braking force of the inner wheel and an amount of decrease BPO of the braking force of the outer wheel, on the basis of the distributed target yawing moment MRq (step S65). Specifically, as the inner target yawing moment MRqI distributed to the inner front wheel increases, the automatic travel control device 110 increases the amount of increase BPI of the braking force of the inner front wheel. Further, as the inner target yawing moment MRqI distributed to the inner rear wheel increases, the automatic travel control device 110 increases the amount of increase BPI of the braking force of the inner rear wheel. Similarly, as the outer target yawing moment MRqO distributed to the outer front wheels increases, the automatic travel control device 110 increases the amount of decrease BPO of the braking force of the outer front wheels. Further, as the outer target yawing moment MRqO distributed to the outer rear wheels increases, the automatic travel control device 110 increases the amount of decrease BPO of the braking force of the outer rear wheel. At this time, the magnitude of the amount of increase BPI of the braking force of the inner front wheel is equal to the magnitude of the amount of decrease BPO of the braking force of the outer front wheel, and the magnitude of the amount of increase BPI of the braking force of the inner rear wheel is equal to the magnitude of the amount of decrease BPO of the braking force of the outer rear wheel. Therefore, in this specification, an example of an "increase and decrease amount computation unit" is configured in which, as the inner target yawing moment MRqI distributed to the inner wheel increases, the automatic travel control device 110 increases the amount of increase BPI of the braking force of the inner wheel, and as the outer target yawing moment MRqO distributed to the outer wheel increases, the automatic travel control device 110 increases the amount of decrease BPO of the braking force of the outer wheel.

Further, the amount of increase BPI of the braking force of the inner front wheel is a value capable of generating the inner target yawing moment MRqI distributed to the inner front wheel in the vehicle C0, when the braking force of the inner front wheel is increased by the same amount of increase BPI. Similarly, the amount of increase BPI of the braking force of the inner rear wheel is a value capable of generating the inner target yawing moment MRqI distributed to the inner rear wheel in the vehicle C0, when the braking force of the inner rear wheel is increased by the same amount of increase BPI. Further, the amount of decrease BPO of the braking force of the outer front wheel is a value capable of generating the outer target yawing moment MRqO distributed to the outer front wheels in the vehicle C0, when the braking force of the outer front wheel is decreased by the same amount of decrease BPO. Similarly, the amount of decrease BPO of the braking force of the outer rear wheel is a value capable of generating the outer target yawing moment MRqO distributed to the outer rear wheel in the vehicle C0, when the braking force of the outer rear wheel is decreased by the same amount of decrease BPO.

Subsequently, the automatic travel control device 110 executes a first correction process of the braking force, on the basis of the execution result of step S62 and the execution result of step S65 (step S66). Specifically, the automatic travel control device 110 adds the amount of increase BPI of the braking force of the inner front wheel to the deceleration braking force BP1 of the inner front wheel, sets the sum (=BP1+BPI) thereof as the braking force BP of the inner front wheel, adds the amount of increase BPI of the braking force of the inner rear wheel to the deceleration braking force BP1 of the inner rear wheel, and sets the sum (=BP1+BPI) thereof as the braking force BP of the inner rear wheel. Further, the automatic travel control device 110 subtracts the amount of decrease BPO of the braking force of the outer front wheel from the deceleration braking force BP1 of the outer front wheel, sets the difference (=BP1−BPO) thereof as the braking force BP of the outer front wheel, subtracts the amount of decrease BPO of the braking force of the outer rear wheel from the deceleration braking force BP1 of the outer rear wheel, and sets the difference (=BP1−BPO) thereof as the braking force BP of the outer rear wheel.

Further, the automatic travel control device 110 determines whether or not there is a wheel in which the braking force BP is negative among the respective wheels FL, FR, RL, and RR (step S67). Although the braking force BP of the inner wheel is not negative, the braking force BP of the outer wheel may be negative. Therefore, in step S67, it may be determined whether or not the braking force BP (=BP1−BPO) of at least one of the outer front wheel and the outer rear wheel is negative.

When the braking forces BP of all the wheels FL, FR, RL, and RR are equal to or greater than "0 (zero)" (step S67: NO), the automatic travel control device 110 shifts the process to step S72 to be described later. On the other hand, when there is a wheel having a negative braking force BP (step S67: YES), the automatic travel control device 110 performs redistribution of the braking force in the front and rear wheels (step S68). More specifically, when the braking force BP of the outer rear wheel, which is not a driving wheel, is negative, the automatic travel control device 110 changes both the distribution ratio for the inner wheel and the distribution ratio for the outer wheel so that the braking force BP of the outer rear wheel becomes equal to "0 (zero)". Even in this case, both distribution ratios are equal to each other. Further, the automatic travel control device 110 recomputes the amount of increase BPI of the braking force of the inner front wheel on the basis of the inner target yawing moment MRqI for the inner front wheel after redistribution, and recomputes the amount of increase BPI of the braking force of the inner rear wheel on the basis of the inner target yawing moment MRqI for respect to the inner rear wheel after redistribution. Likewise, the automatic travel control device 110 recomputes the amount of decrease BPO of the braking force of the outer front wheel on the basis of the outer target yawing moment MRqO for the outer front wheel after redistribution, and recomputes the amount of decrease BPO of the braking force of the outer rear wheel on the basis of the outer target yawing moment MRqO for the outer rear wheel after redistribution. Further, the automatic travel control device 110 performs the same correction process as in step S66. After that, the automatic travel control device 110 shifts the process to the next step S69.

When the braking force BP of the outer rear wheel which is not the driving wheel is not negative and the braking force of the outer front wheel which is the driving wheel is negative at the step S68, the automatic travel control device 110 shifts the process to the next step S69, without performing the redistribution of the braking force on the front rear wheel.

In step S69, the automatic travel control device 110 determines whether or not there is a driving wheel in which the braking force BP is negative. In a front wheel drive vehicle, the driving wheel having possibility that the braking force BP may be negative is only the outer front wheel among the inner front wheel and the outer front wheel. Therefore, in step S69, it may be determined whether or not the braking force BP (=BP1−BPO) of the outer front wheel is negative.

When there is no driving wheel in which the braking force BP is negative (step S69: NO), the automatic travel control device 110 shifts the process to step S72 to be described later. On the other hand, when there is a driving wheel in which the braking force BP is negative (step S69: YES), the automatic travel control device 110 requests the engine ECU 120 to increase the drive torque (step S70). At this time, since the wheel in which the braking force BP is negative is the outer front wheel, when the absolute value of the difference obtained by subtracting the amount of decrease BPO of the braking force of the outer front wheel from the deceleration braking force BP1 of the outer front wheel is defined as a "increase request value DPRq of the driving force", the automatic travel control device 110 requests the engine ECU 120 to increase the drive torque so that the driving force DP of the outer front wheel increases by the increase request value DPRq of the driving force.

Subsequently, the automatic travel control device 110 performs a second correction process of the braking force on the basis of an increase in the drive torque of the engine 12 (step S71). The drive torque from the engine 12 is transmitted not only to the outer front wheel but also to the inner front wheel via the differential 14. As a result, when the drive torque from the engine 12 is increased for the purpose of increasing the driving force DP of the outer front wheel, not only the driving force DP of the outer front wheel but also the driving force DP of the inner front wheel are increased. Therefore, in step S71, the automatic travel control device 110 sets the amount of braking force correction BPRe to a value equal to an amount of increase ΔDP of the driving force of the inner front wheel accompanied by the increase in the drive torque from the engine 12. For example, when half of the drive torque from the engine 12 is transmitted to the outer front wheel and the rest is transmitted to the inner front wheel, since the amount of increase ΔDP of the driving force of the inner front wheel is equal to the increase request value DPRq of the driving force, the amount of braking force correction BPRe becomes a value which is equal to the absolute value of the increase request value DPRq of the driving force. Further, the automatic travel control device 110 sets the braking force BP of the inner front wheel to be equal to the sum of the deceleration braking force BP1 of the inner front wheel, the amount of increase BPI of the braking force of the inner front wheel, and the amount of braking force correction BPRe. Thereafter, the automatic travel control device 110 shifts the process to the next step S72.

In step S72, the automatic travel control device 110 executes a redistribution process of the braking force, which will be described later, using FIG. 10. That is, in this specification, execution of the processes from step S64 to step S72 is the execution of the moment control. In this respect, an example of the "moment control unit" for executing the moment control is constituted by the automatic travel control device 110. After that, the automatic travel control device 110 terminates the processing routine.

Next, the redistribution process of the braking force (processing routine) of step S72 will be described with reference to the flowchart illustrated in FIG. 10.

Figure 10:
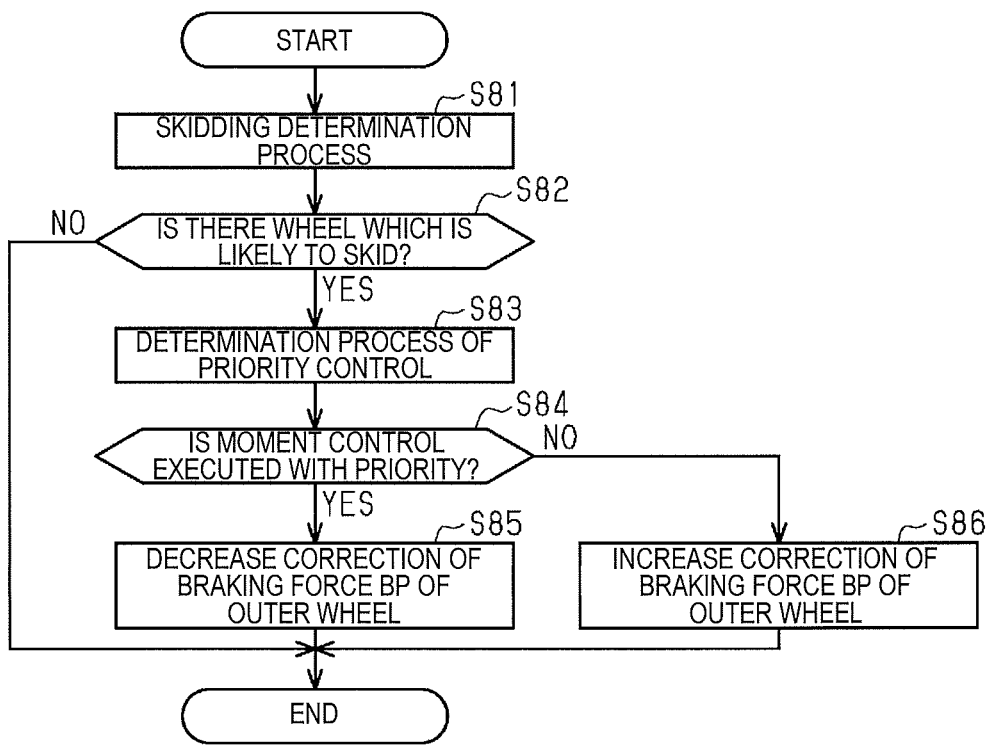
FIG. 10 is a flowchart illustrating a processing routine for determining which one of the deceleration control and the moment control to be preferentially executed in the vehicle travel assistance system of the first embodiment.
Figure 11:
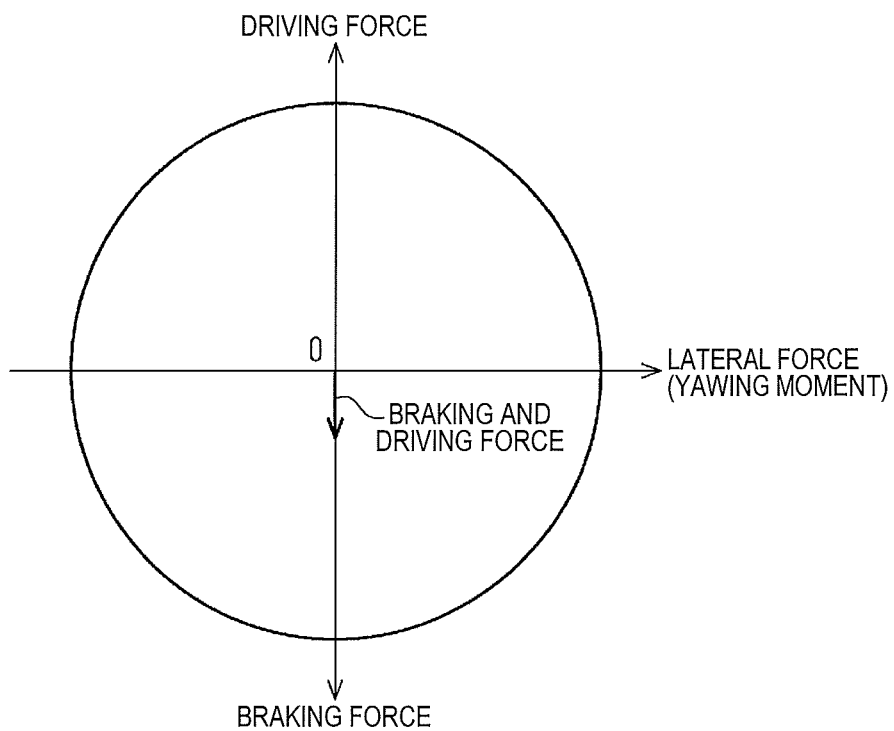
FIG. 11 is a schematic diagram illustrating a friction circle of a wheel in a vehicle including the travel assistance system for the vehicle according to the first embodiment.

As illustrated in FIG. 10, the automatic travel control device 110 performs a skidding determination process of each of the wheels FL, FR, RL, and RR (step S81). Whether the wheels FL, FR, RL, and RR are likely to skid sideways can be explained, using a friction circle illustrated in FIG. 11. That is, as illustrated in FIG. 11, as the absolute value of the braking and driving force which is the difference obtained by subtracting the driving force from the braking force of the wheel increases, the wheel easily slips sideways at a stage in which the lateral force acting on the vehicle is small. Therefore, when the lateral acceleration Gy of the vehicle is made too large, there is a possibility that some of the respective wheels FL, FR, RL, and RR are likely to skid sideways. Therefore, for example, the automatic travel control device 110 sets the target value of the braking and driving force of the wheel so as to decrease as the lateral acceleration Gy of the vehicle increases, and the automatic travel control device 110 determines whether or not the braking and driving force is equal to or higher than the target value for each of the wheels FL, FR, RL, and RR. Further, when there is a wheel in which the braking and driving force is equal to or higher than the target value, the automatic travel control device 110 can determine that the wheel is a wheel that is easy to skid sideways.

Further, when it is determined that there are no wheels that are likely to skid sideways (step S82: NO), the automatic travel control device 110 terminates this processing routine. On the other hand, when it is determined that there are wheels that are likely to skid sideways (step S82: YES), the automatic travel control device 110 shifts the process to the next step S83. Therefore, in the present specification, the automatic travel control device 110 configures an example of "lateral slip determination unit" which determines whether or not there are wheels that are likely to skid, on the basis of the braking force BP of the wheel, the driving force DP of the wheel, and the lateral acceleration Gy of the vehicle.

In step S83, the automatic travel control device 110 performs a determination process of a priority control for determining whether or not to execute any one of the deceleration control and the moment control with priority. The determination process can be performed using the map illustrated in FIG. 12.

Figure 12:
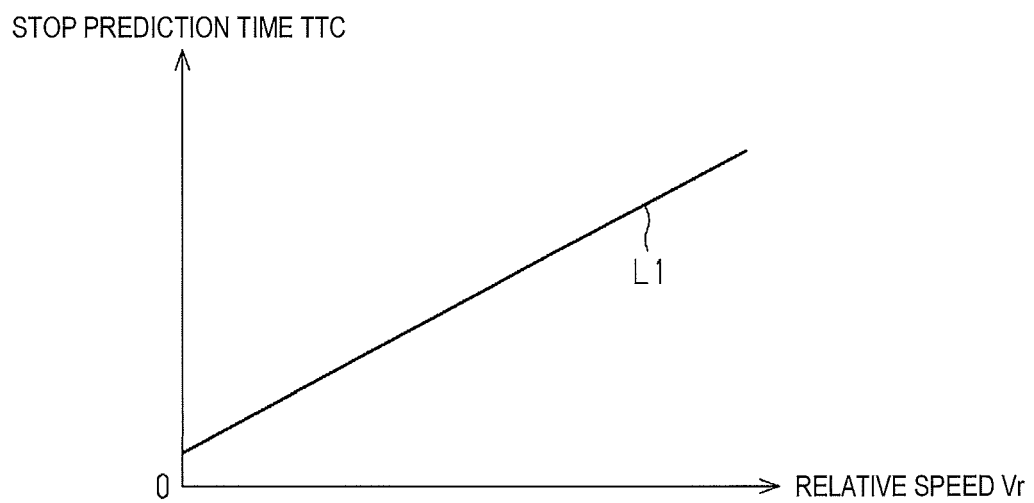
FIG. 12 is a map used for determining whether a collision between the vehicle and an obstacle can be avoided by execution of the deceleration control in the vehicle travel assistance system of the first embodiment.

Here, FIG. 12 is a map for determining whether or not collision between the vehicle C0 and the obstacle C1 can be avoided by the execution of the deceleration control, that is, whether the relative speed Vr can be set to "0 (zero)" or less before the obstacle C1. A solid line in FIG. 12 indicates a boundary line L1 representing a relation between the relative speed Vr of the vehicle and the stop prediction time TTC which is the computed value of the time until the relative speed Vr becomes equal to "0 (zero)" by the execution of the deceleration control. The boundary line L1 is set such that the longer the relative speed Vr is, the longer the stop prediction time TTC becomes.

The predicted value of the time until the relative speed Vr of the vehicle becomes "0 (zero)" can be computed from the front-rear deceleration Ax of the current time of the vehicle C0 and the linear distance from the vehicle C0 to the obstacle C1. When the coordinate position indicating the predicted value of the time and the relative speed Vr is located on the boundary line L1, and when the coordinate position is located above the boundary line L1, it is possible to determine that the relative speed Vr can be set to "0 (zero)" or less in front of the obstacle C1 by the deceleration of the vehicle by the execution of the deceleration control. Therefore, the automatic travel control device 110 determines that the deceleration control is the priority control. On the other hand, when the coordinate position indicating the predicted value of the time and the relative speed Vr of the vehicle is located below the boundary line L1, the automatic travel control device 110 can determine that it is not possible to set the relative speed Vr to "0 (zero)" or less in front of the obstacle C1 only by decelerating the vehicle by executing the deceleration control and there is a possibility that collision between the vehicle C0 and the obstacle C1 cannot be avoided. Therefore, the automatic travel control device 110 determines that the moment control is the priority control.

Returning to FIG. 10, the automatic travel control device 110 determines whether to execute the moment control preferentially over the deceleration control as a result of the process of step S83 (step S84). Therefore, in the present specification, the automatic travel control device 110 configures an example of a "collision avoidance determination unit" which determines whether or not the relative speed Vr can be set to "0 (zero)" or less in front of the obstacle C1, on the basis of a relation between the relative speed Vr of the vehicle and the predicted value of the time until the relative speed Vr becomes equal to "0 (zero)" by the execution of the deceleration control.

When the moment control is preferentially executed over the deceleration control (step S84: YES), the automatic travel control device 110 performs a decrease correction which decreases the braking force BP of the outer wheel (step S85). By further decreasing the braking force BP of the outer wheel in this way, it is possible to further increase the yawing moment of the vehicle without increasing the braking force BP of the inner wheel. However, when the braking force BP of the outer wheel is decreased as described above, the braking force of the entire vehicle decreases and the front-rear deceleration Ax of the vehicle C0 (that is, the value obtained by multiplying the front-rear acceleration Gx by "−1") becomes smaller. Further, when the front-rear deceleration Ax becomes too small, the approaching speed between the vehicle C0 and the obstacle C1 increases. Therefore, the amount of decrease of the braking force BP of the outer wheel in step S85 is set to a value at which the amount of decrease of the front-rear deceleration of the vehicle falls within the allowable range. Further, the automatic travel control device 110 which performs the decrease correction of the braking force BP of the outer wheel in this way terminates the processing routine.

On the other hand, when the deceleration control is preferentially executed over the moment control (step S84: NO), the automatic travel control device 110 performs an increase correction which increases the braking force BP of the outer wheel (step S86). By increasing the braking force BP of the outer wheel in this way, it is possible to further increase the front-rear deceleration Ax of the vehicle. However, when increasing the braking force BP of the outer wheel in this way, the yawing moment of the vehicle decreases. Therefore, the amount of increase of the braking force BP of the outer wheel in step S86 is set to a value of an extent at which the amount of decrease of the yawing moment of the vehicle falls within the allowable range.

Further, the automatic travel control device 110 which performs the increase correction of the braking force BP of the outer wheel in this way terminates the processing routine.

Next, with reference to the timing chart illustrated in FIG. 13, the action when both the deceleration control and the moment control are executed in order to avoid collision between the traveling vehicle C0 and the obstacle C1 will be described together with the effect. As a precondition, the execution of the moment control is started under the condition that the braking force is assumed to be applied to the vehicle C0 by the execution of the deceleration control. In the moment control, in order to avoid a collision between the vehicle C0 and the obstacle C1, the vehicle C0 is caused to perform a yawing motion in a manner of making a left turn (rotate).

As illustrated in FIGS. 13(a), 13(b), 13(c), 13(d), 13(e), 13(f) and 13(g), when the deceleration control is executed to avoid collision between the vehicle C0 and the obstacle C1, the braking force BP (that is, the deceleration braking force BP1) is applied to each of the wheels FL, FR, RL, and RR so that the front-rear deceleration Ax of the vehicle C0 becomes equal to the target front-rear deceleration Axtgt. That is, the braking force BP (deceleration braking force BP1) corresponding to the distributed target front-rear deceleration Axtgt is applied to each of the wheels FL, FR, RL, and RR. Further, at the first timing t11 during which the vehicle body speed VS is decreasing due to the execution of the deceleration control, it is determined that there is a possibility that collision between the vehicle C0 and the obstacle C1 cannot be avoided merely by executing the deceleration control, and the moment control is started.

When the moment control is executed, the distribution of the braking force to each of the wheels FL, FR, RL, and RR is changed. That is, the inner target yawing moment MRqI, which is half of the target yawing moment MRq, is distributed to the left wheels FL and RL which are the inner wheels. Further, the outer target yawing moment MRqO, which is half of the target yawing moment MRq, is distributed to the right wheels FR and RR which are the outer wheels. Further, the braking force BP of the left front wheel FL is made equal to the sum (=BP1+BPI) obtained by adding the deceleration braking force BP1 and the amount of increase BPI of the braking force corresponding to the inner target yawing moment MRqI distributed to the left front wheel FL. Similarly, the braking force BP of the left rear wheel RL is made equal to the sum (=BP1+BPI) obtained by adding the deceleration braking force BPI and the amount of increase BPI of the braking force corresponding to the inner target yawing moment MRqI distributed to the left rear wheel RL. Further, the braking force BP of the right front wheel FR is made equal to a difference (=BP1−BPO) obtained by subtracting the amount of decrease BPO of the braking force corresponding to the outer target yawing moment MRqO distributed to the right front wheel FR from the deceleration braking force BP1. Similarly, the braking force BP of the right rear wheel RR is made equal to the difference (=BP1−BPO) obtained by subtracting the amount of decrease BPO of the braking force corresponding to the outer target yawing moment MRqO distributed to the right rear wheel RR from the deceleration braking force BP1.

Figure 13:
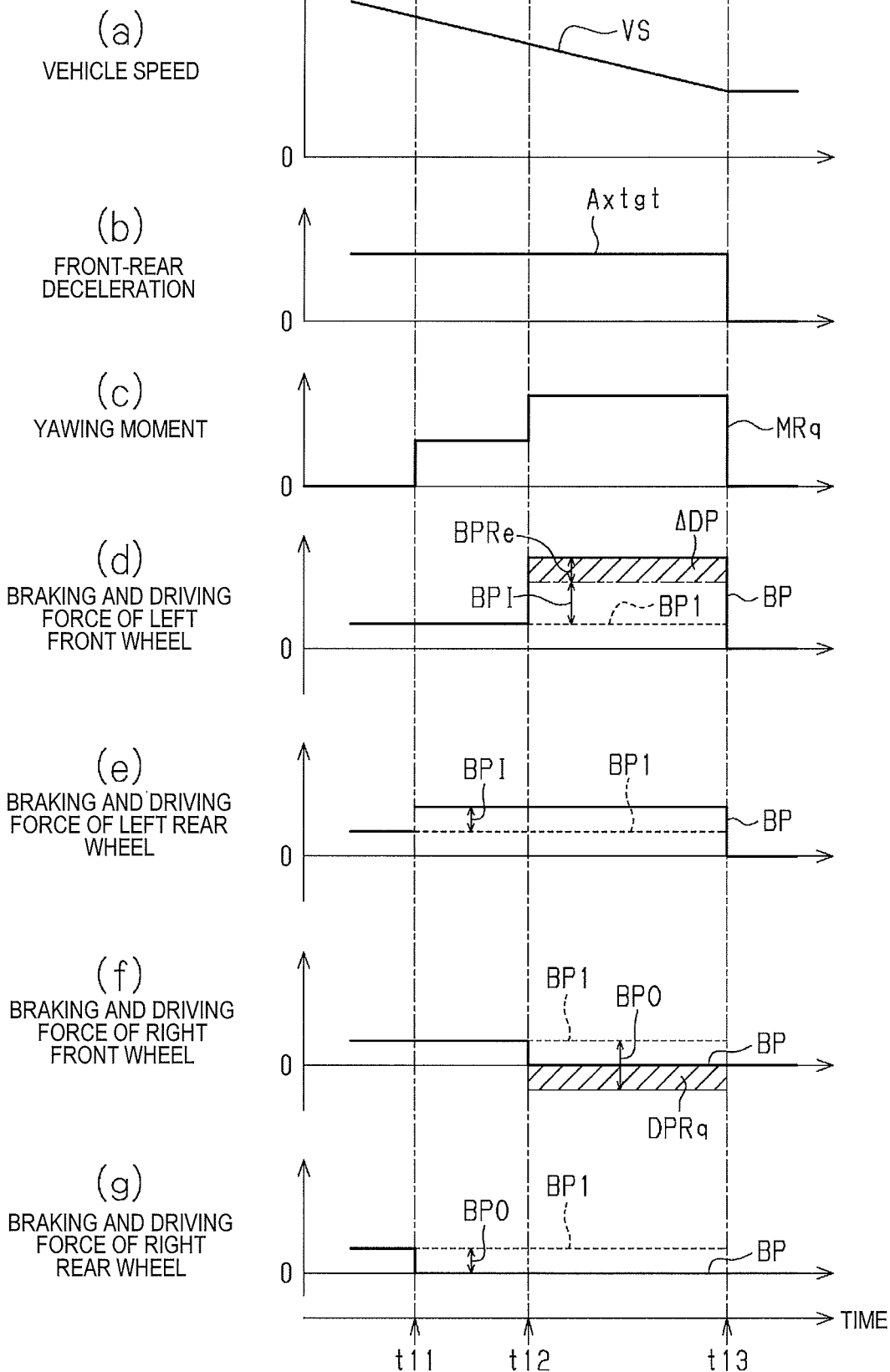
FIG. 13 is a timing chart when both the deceleration control and the moment control are executed in the vehicle travel assistance system of the first embodiment.

Further, in the example illustrated in FIG. 13, all the inner target yawing moments MRqI are distributed to the left rear wheel RL, and the amount of distribution of the inner target yawing moment MRqI to the left front wheel FL is "0 (zero)". Similarly, all the outer target yawing moments MRqO are distributed to the right rear wheel RR, and the amount of distribution of the outer target yawing moment MRqO to the right front wheel FR is "0 (zero)". Therefore, since the amount of increase BPI of the braking force of the left front wheel FL is "0 (zero)" and the amount of decrease BPO of the braking force of the right front wheel FR is "0 (zero)", the braking force BP of both the left front wheel FL and the right front wheel FR does not change before and after the first timing t11.

Further, in the example illustrated in FIG. 13, the amount of decrease BPO of the braking force corresponding to the outer target yawing moment MRqO distributed to the right rear wheel RR is equal to the deceleration braking force BP1 of the right rear wheel RR. Therefore, the braking force BP of the right rear wheel RR is equal to "0 (zero)".

When the moment control is started in this way, a difference in braking force corresponding to the target yawing moment MRq occurs between the left rear wheel RL and the right rear wheel RR. As a result, a yawing moment is generated in the vehicle C0, and the yawing motion is performed in the direction in which the vehicle C0 makes a left turn. In addition, since a difference in braking force is generated between the left rear wheel RL and the right rear wheel RR without changing the braking force of the entire vehicle, that is, the total of the braking forces BP of the respective wheels FL, FR, RL, and RR, the deviation between the front-rear deceleration Ax of the vehicle C0 and the target front-rear deceleration Axtgt is hard to occur. Therefore, when a difference in braking force is generated between the left wheel and the right wheel to cause the vehicle to perform a desired yawing motion, it is possible to suppress the deviation between the front-rear deceleration Ax of the vehicle C0 and the target front-rear deceleration Axtgt which is the requirement deceleration.

Under circumstances in which both the deceleration control and the moment control are executed, the target yawing moment MRq may be changed in some cases. When the target yawing moment MRq is thus changed, the distribution of the braking force to the respective wheels FL, FR, RL, and RR is performed again. Further, in the example illustrated in FIG. 13, the target yawing moment MRq increases at the second timing t12.

Here, when all the inner target yawing moments MRqI are distributed to the left rear wheel RL and all the outer target yawing moments MRqO are distributed to the right rear wheel RR, the amount of decrease BPO of the braking force corresponding to the outer target yawing moment MRqO distributed to the right rear wheel RR becomes larger than the deceleration braking force BP1 of the right rear wheel RR. That is, the difference obtained by subtracting the amount of decrease BPO of the braking force of the right rear wheel RR from the deceleration braking force BP1 of the right rear wheel RR is negative. Therefore, the redistribution of the target yawing moment MRq is performed such that the difference obtained by subtracting the amount of decrease BPO of the braking force of the right rear wheel RR from the deceleration braking force BPI of the right rear wheel RR is not negative, that is, the difference is "0 (zero)".

At this time, in order to suppress the change in the braking force of the vehicle caused by the redistribution of the braking force, not only the redistribution of the outer target yawing moment MRqO to the right front wheel FR and the right rear wheel RR, but also the redistribution of the inner target yawing moment MRqI to the left front wheel FL and the left rear wheel RL are performed. Through such redistribution, the amount of decrease BPO of the braking force of the right rear wheel RR decreases, and meanwhile, the amount of decrease BPO of the braking force of the right front wheel FR increases. Further, the amount of increase BPl of the braking force of the left rear wheel RL decreases, and meanwhile, the amount of increase BPI of the braking force of the left front wheel FL increases. As a result, the braking force BP of the right rear wheel RR and the braking force BP of the left rear wheel RL are held at a value before the target yawing moment MRq is changed, that is, at a value before the second timing t12. On the other hand, the braking force BP of the right front wheel FR decreases, and the braking force BP of the left front wheel FL increases. In this way, merely by generating a difference in braking force between the left rear wheel RL and the right rear wheel RR, when the vehicle C0 cannot make a desired yawing motion, by also generating a difference in braking force between the left front wheel FL and the right front wheel FR, the yawing moment of the vehicle C0 increases. Accordingly, when the braking forces BP of all the wheels FL, FR, RL, and RR are not negative, by performing the redistribution of the braking force between the front wheels and the rear wheels in this way, it is possible to cause the vehicle C0 to perform a desired yawing motion, without changing the front-rear deceleration Ax of the vehicle C0.

In the example illustrated in FIG. 13, since the amount of decrease BPO of the braking force of the right front wheel FR, which is the driving wheel, is larger than the deceleration braking force BP1 of the right front wheel FR, the braking force BP of the right front wheel FR is negative. In this case, only with the distribution of the braking force to each of the wheels FL, FR, RL, and RR, it is not possible to cause the vehicle C0 to perform a desired yawing motion, while suppressing a change in the front-rear deceleration Ax of the vehicle C0. Therefore, the driving force DP between the left front wheel FL and the right front wheel FR, which are driving wheels, is also adjusted.

More specifically, the increase request value DPRq of the driving force, which is the absolute value of the difference obtained by subtracting the amount of decrease BPO of the braking force of the right front wheel FR from the deceleration braking force BP1 of the right front wheel FR, is computed, and the drive torque output from the engine 12 is increased so that the driving force DP of the right front wheel FR is increased by the increase request value DPRq of the driving force. At this time, since the braking force BP of the right front wheel FR is "0 (zero)", no braking force is applied to the right front wheel FR.

When the drive torque of the engine 12 increases in this way, not only the driving force DP of the right front wheel FR but also the driving force DP of the left front wheel FL increase. The amount of increase ΔDP of the driving force of the left front wheel FL can be computed by acquiring the distribution ratio of the drive torque to the left front wheel FL and the right front wheel FR by the differential 14. Further, an amount of braking force correction BPRe is set to a value equal to the computed amount of increase ΔDP of the driving force of the left front wheel FL. Then, the braking force BP of the left front wheel FL becomes equal to the sum (=BP1+BPI+BPRe) obtained by adding the deceleration braking force BP1 of the left front wheel FL, the amount of increase BPI of the braking force of the left front wheel FL, and the amount of braking force correction BPRe. That is, the amount of increase ΔDP of the driving force of the left front wheel FL is canceled out by the increase in the braking force BP of the left front wheel FL. Therefore, by not only changing the distribution of the braking force to the respective wheels FL, FR, RL, and RR, but also by adjusting the driving force DP of the respective front wheels FL and FR which are the driving wheels, it is possible to cause the vehicle C0 to perform a desired yawing motion, while decelerating the vehicle C0 with the target front-rear deceleration Axtgt which is set by the deceleration control.

When it is determined that collision between the vehicle C0 and the obstacle C1 can be avoided by the execution of the deceleration control and the moment control at the third timing t13 thereafter, the deceleration control and the moment control are terminated. Then, the application of the braking force BP to the respective wheels FL, FR, RL, and RR by execution of the deceleration control and the moment control, and the state in which the drive torque of the engine 12 increases are terminated.

Meanwhile, steering may be performed by the driver in the middle of execution of the deceleration control and the moment control as described above. In this case, when the rotational direction (turning direction) of the vehicle C0 required by the driver who performs steering is opposite to a direction in which the vehicle C0 is rotated by execution of the moment control, execution of the moment control is terminated. That is, there is a state in which no difference in braking force occurs between the left wheel and the right wheel. As a result, it is possible to cause the vehicle C0 to perform a yawing motion according to the request of the driver who performs steering.

Further, such steering may be performed in a situation in which moment control is not yet performed. In such a case, since the moment control is not executed even when the target yawing moment MRq is set, it is possible to cause the vehicle C0 to perform a yawing motion according to the request of the driver who performs steering.

By not executing the moment control in this way, it is possible to suppress unnecessary operation of the brake actuator 33 and the respective brake mechanisms 35a to 35d. Therefore, it is also possible to suppress shortening of the service life of the brake actuator 33 and the respective brake mechanisms 35a to 35d.

Further, when the rotational direction of the vehicle C0 required by the driver who performs the steering is the same as the direction in which the vehicle C0 is desired to rotate by execution of the moment control, it is possible to cause the vehicle C0 to perform a desired yawing motion by cooperation between the steering of the driver and the moment control. Specifically, the target yawing moment MRq decreases as the steering moment Mstr, which is a predicted value of the yawing moment caused by steering, increases. As a result, since the target yawing moment MRq distributed to each of the wheels FL, FR, RL, and RR decreases, both the amount of increase BPI of the braking force of the left wheel and the amount of increase BPI of the braking force of the right wheel are decreased and corrected. The braking force BP of the left wheel and the braking force BP of the right wheel are computed, using the amount of increase BPI of the braking force of the left wheel and the amount of increase BPI of the braking force of the right wheel thus decreased and corrected. Therefore, the yawing motion of the vehicle C0 can be appropriately controlled through cooperation between the steering of the driver and the moment control.

However, even if the rotational direction of the vehicle C0 required by the driver who performs the steering is the same as the direction in which the vehicle C0 is desired to rotate by execution of the moment control, when the steering moment Mstr is large, collision between the vehicle C0 and the obstacle C1 can be avoided by changing the steering angle of the front wheels FL and FR that are the steering wheels. In the case where the moment control is executed under such circumstances, there is a possibility that an excessively large yawing moment occurs in the vehicle C0. Therefore, in such a case, the moment control is not executed, or the executed moment control is terminated. Therefore, an event that an excessively large yawing moment occurs in the vehicle C0 is hard to occur. Further, since it is possible to suppress unnecessary operations of the brake actuator 33 and the respective brake mechanisms 35a to 35d, it is also possible to suppress shortening of the service life of the brake actuator 33 and the respective brake mechanisms 35a to 35d.

Further, because the braking force BP of some wheels (that is, the inner wheel) increases by the distribution of the braking force to the respective wheels FL, FR, RL, and RR due to the execution of the moment control, there is a possibility that some wheels easily skid on the relationship between the friction circle. In such a case, depending on the situation at that time, it is determined whether to preferentially decelerate the vehicle C0 by the deceleration control or to preferentially turn the vehicle C0 by the moment control. Further, when the deceleration control is preferentially executed, the braking force BP of the outer wheel having a relatively small braking force increases. As a result, as the front-rear deceleration Ax of the vehicle increases, the relative speed Vr can be set to "0 (zero)" or less in front of the obstacle C1, that is, the vehicle C0 can be stopped in front of the obstacle C1. Further, by increasing the braking force BP of the outer wheel in this way, it is possible to reduce the yawing moment of the vehicle C0, that is, the lateral acceleration of the vehicle C0. As a result, it is also possible to eliminate the state in which some wheels easily skid.

On the other hand, when preferentially executing the moment control, by further decreasing the braking force BP of the outer wheel, the difference in braking force between the inner wheel and the outer wheel increases without increasing the braking force BP of the inner wheel. As a result, since the yawing moment of the vehicle C0 further increases, collision between the vehicle C0 and the obstacle C1 can be easily avoided by the yawing motion of the vehicle C0.

Second Embodiment

Next, a second embodiment embodying a vehicle travel assistance system will be described with reference to FIGS. 14 and 15. The vehicle travel assistance system of the embodiment is different from the first embodiment in that the moment control is executed even under the condition that the deceleration control is not executed. Therefore, in the following explanation, the parts different from the first embodiment will be mainly described, and the same or corresponding member configurations as those of the first embodiment are denoted by the same reference numerals, and repeated explanation will not be provided.

In the case of executing the moment control without executing the deceleration control, for example, the case of changing the traveling lane of the vehicle C0, a case where the road curves and the vehicle C0 is caused to be turned along the curve, and the like can be mentioned. In such a case, although the deceleration control flag FLG1 is set to OFF, the moment control flag FLG2 may be set to ON. Further, when the deceleration control flag FLG1 is set to OFF and the target yawing moment MRq is set to a value larger than "0 (zero)", by executing the processing routine illustrated in the flowchart of FIG. 14, it is possible to cause the vehicle C0 to perform a yawing motion.

Next, a computation process (processing routine) of the braking and driving force executed under the condition that the deceleration control flag FLG1 is set to OFF will be described with reference to the flowchart illustrated in FIG. 14.

Figure 14:
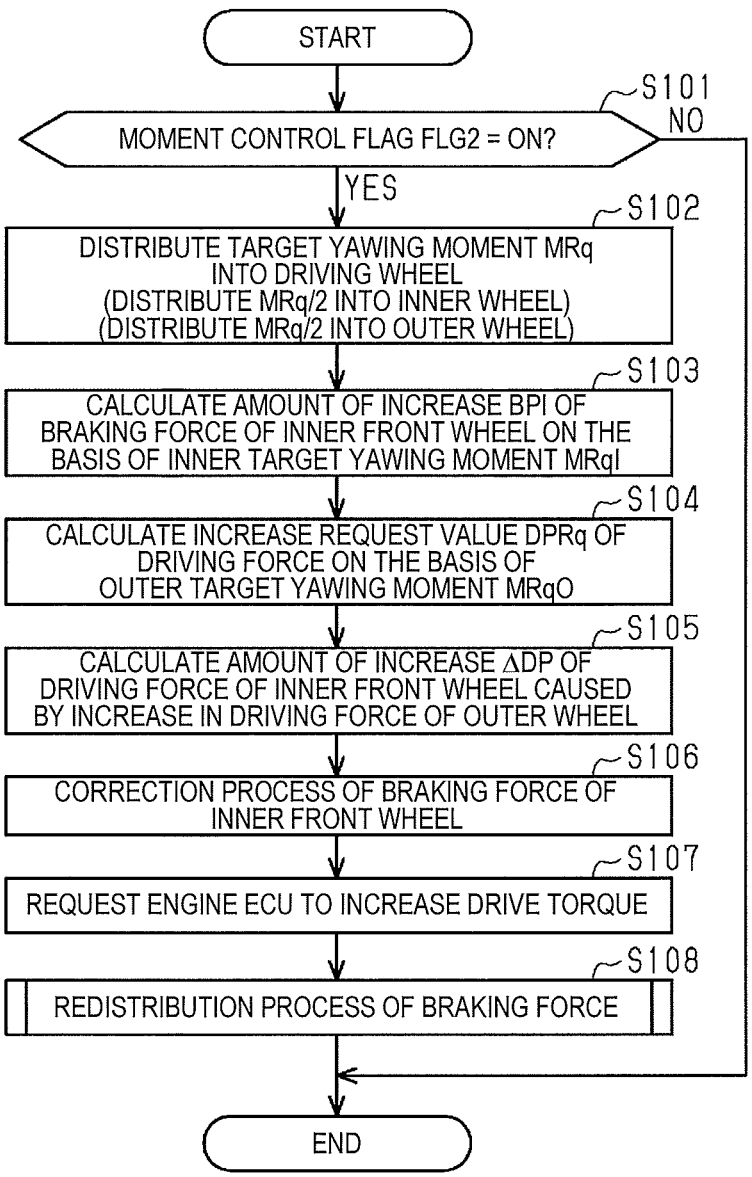
FIG. 14 is a flowchart illustrating the processing contents of moment control in a vehicle travel assistance system according to a second embodiment.
Figure 15:
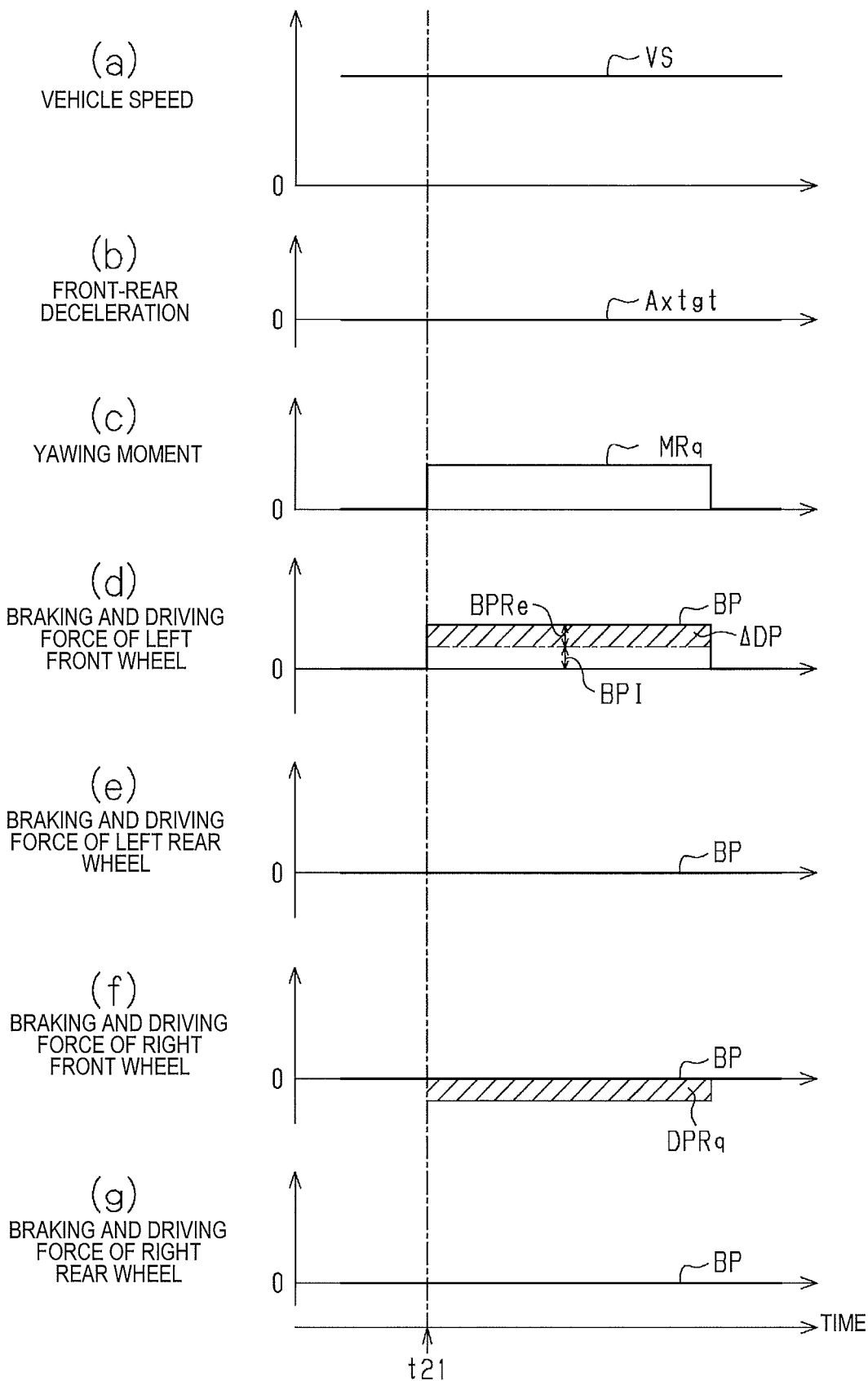
FIG. 15 is a timing chart when moment control is executed in the vehicle travel assistance system of the second embodiment.

As illustrated in FIG. 14, when the moment control flag FLG2 is set to OFF (step S101: NO), the automatic travel control device 110 terminates this processing routine. On the other hand, when the moment control flag FLG2 is set to ON (step S101: YES), the automatic travel control device 110 distributes the target yawing moment MRq to the front wheels FL and FR which are driving wheels (step S102). At this time, the automatic travel control device 110 distributes the inner target yawing moment MRqI (=MRq/2), which is half of the target yawing moment MRq, to the inner front wheel, and distributes the remaining outer target yawing moment MRqO (=MRq/2) to the outer front wheel. In this regard, in the present specification, the automatic travel control device 110 functions as an example of the "distribution unit".

Subsequently, the automatic travel control device 110 computes an amount of increase BPI of the braking force of the inner front wheel on the basis of the distributed inner target yawing moment MRqI (step S103). Specifically, the automatic travel control device 110 increases the amount of increase BPI of the braking force of the inner front wheel, as the inner target yawing moment MRqI increases. In this regard, in this specification, the automatic travel control device 110 functions as an example of the "increase and decrease amount computation unit".

Further, the automatic travel control device 110 computes an increase request value DPRq of the driving force, which is an amount of increase of the driving force of the outer front wheel based on the distributed outer target yawing moment MRqO (step S104). Specifically, the automatic travel control device 110 sets the increase request value DPRq of the driving force to a larger value, as the outer target yawing moment MRqO increases.

Subsequently, under the assumption that the drive torque of the engine 12 increases to enlarge the driving force DP of the outer front wheel by the increase request value DPRq of the driving force computed in step S104, the automatic travel control device 110 computes the amount of increase ΔDP of the driving force of the inner front wheel due to the increase in the drive torque (step S105). The automatic travel control device 110 can compute the amount of increase ΔDP of the driving force of the inner front wheel, on the basis of the request value of the amount of increase of the drive torque of the engine 12, and the distribution ratio of the drive torque to the inner wheel and the outer wheel by the differential 14.

Further, the automatic travel control device 110 performs a correction process of the braking force of the inner wheel (step S106). That is, the automatic travel control device 110 sets the amount of braking force correction BPRe to a value equal to the amount of increase ΔDP of the driving force of the inner front wheel computed in step S105. Further, the automatic travel control device 110 sets the braking force BP of the inner front wheel to be equal to the sum of the braking force applied to the inner front wheel from before the start of the moment control, the amount of increase BPI of the braking force of the inner front wheel, and the amount of braking force correction BPRe.

Subsequently, the automatic travel control device 110 requests the engine ECU 120 to increase the drive torque (step S107). Further, the automatic travel control device 110 performs the redistribution process of braking force (step S108) similarly to the above-described step S72, and thereafter terminates this processing routine.

Next, with reference to the timing chart illustrated in FIG. 15, the operation when the moment control is executed while keeping the vehicle body speed VS of the vehicle C0 at a constant speed will be explained together with the effect. As a premise, in the moment control, in order to avoid collision between the vehicle C0 and the obstacle C1, a yawing motion in the form of left turning on the vehicle C0 is performed.

As illustrated in FIGS. 15(a), 15(b), 15(c), 15(d), 15(e), 15(f) and 15(g), at the first timing t21 when the braking force BP is not applied to all the wheels FL, FR, RL, and RR, when the target yawing moment MRq is set to a value different from "0 (zero)", the moment control is started.

When the moment control is executed, the inner target yawing moment MRqI, which is a half of the target yawing moment MRq, is distributed to the left front wheel FL which is the driving wheel, among the left wheels FL and RL. Further, the outer target yawing moment MRqO, which is a half of the target yawing moment MRq, is distributed to the right front wheel FR which is the driving wheel, among the right wheels FR and RR. That is, even when the deceleration control is not executed in this way, the distribution ratio for the inner wheel is equal to the distribution ratio for the outer wheel.

Then, the amount of increase BPI of the braking force of the left front wheel FL is set to a value corresponding to the inner target yawing moment MRqI which is distributed to the left front wheel FL, and the increase request value DPRq of the driving force is set to a value corresponding to the outer target yawing moment MRqO which is distributed to the right front wheel FR.

When the drive torque of the engine 12 is increased to increase the driving force DP of the right front wheel FR, the driving force DP of the left front wheel FL is also increased. The amount of increase ΔDP of the driving force of the left front wheel FL is computed by acquiring the distribution ratio of the drive torque to the left front wheel FL and the right front wheel FR by the differential 14. Further, the amount of braking force correction BPRe is set to a value equal to the computed amount of increase ΔDP of the driving force of the left front wheel FL. Then, the braking force BP of the left front wheel FL is equal to the sum (=BPI+BPRe) of the braking force (in this case, "0 (zero)") applied to the left front wheel FL before the start of the moment, the amount of increase BPI of the braking force corresponding to the inner target yawing moment MRqI distributed to the left front wheel FL, and the amount of the braking force correction BPRe.

Further, as described above, when the drive torque of the engine 12 is increased and the braking force BP of the left front wheel FL is adjusted, the yawing moment of the vehicle C0 becomes substantially equal to the target yawing moment MRq. In addition, the increase in the braking force of the vehicle C0 caused by the execution of the moment control is offset by the increase in the driving force. Therefore, it is possible to cause the vehicle C0 to perform a desired yawing motion, while performing a constant speed travel of the vehicle C0, that is, without changing the front-rear deceleration Ax of the vehicle C0.

Each of the above-described embodiments may be changed to another embodiment as described below.

In the second embodiment, when the vehicle performs the constant speed travel, after the target front-rear deceleration Axtgt is set to "0 (zero)", the moment control is executed. In contrast, when the vehicle C0 is accelerating, after setting the negative value to the target front-rear deceleration Axtgt, the moment control may be executed. In this case, by appropriately adjusting the braking and driving force of each drive wheel, it is possible to cause the vehicle C0 to perform a desired yawing motion, while maintaining the acceleration state of the vehicle C0.

Further, at the time of brake operation of the driver, after setting the requirement deceleration according to the brake operation amount BA of the driver to the target front-rear deceleration Axtgt, the moment control may be executed. According to this, it is possible to cause the vehicle to perform the yawing motion, while maintaining the front-rear deceleration required by the driver for the vehicle.

In each embodiment, the direction of the steering moment Mstr generated by steering of the driver is the same as the direction of the control moment generated by execution of the moment control, and when the magnitude |Mstr| of the steering moment is equal to or less than the magnitude |MRq| of the target yawing moment, the target yawing moment MRqI is reduced and corrected. As a result, it is possible to decrease the braking force BP of the inner wheel or to increase the braking force BP of the outer wheel, which makes it possible to reduce the difference in braking force between the inner wheel and the outer wheel. However, as long as it is possible to reduce the difference in braking force between the inner wheel and the outer wheel, another method may be adopted. For example, the amount of increase BPI of the braking force of the inner wheel which is set in accordance with the inner target yawing moment MRqI may be reduced and corrected, and the amount of decrease BPO of the braking force of the outer wheel which is set in accordance with the outer target yawing moment MRqO may be reduced and corrected. Even in this case, the braking force BP of the inner wheel can be decreased and corrected, and the braking force BP of the outer wheel can be increased and corrected, which makes it possible to reduce the difference in braking force between the inner wheel and the outer wheel.

Further, the inner target yawing moment MRqI and the outer target yawing moment MRqO may be reduced and corrected. Even in this case, it is possible to decrease the amount of increase BPI of the braking force of the inner wheel which is set in accordance with the inner target yawing moment MRqI, and to decrease the amount of decrease BPO of the braking force of the outer wheel which is set in accordance with the outer target yawing moment MRqO. As a result, the braking force BP of the inner wheel can be decreased and corrected, and the braking force BP of the outer wheel can be increased and corrected, which makes it possible to reduce the difference in braking force between the inner wheel and the outer wheel.

In each of the embodiments, even when the direction of the steering moment Mstr generated by steering of the driver is different from the direction of the control moment generated by the execution of the moment control, the moment control may be executed.

In each of the embodiments, even when the direction of the steering moment Mstr generated by steering of the driver is the same as the direction of the control moment generated by execution of the moment control, and the steering moment Mstr is larger than the target yawing moment MRq, the moment control may be executed.

In each of the embodiments, when it is determined that steering is being performed by the driver under the condition that the difference in braking force is generated between the left wheel and the right wheel by the moment control, the difference in braking force at the same time may be maintained, regardless of the steering direction or the steering amount.

In each of the embodiments, when it is determined that the steering is performed by the driver, the moment control may not be executed.

In the first embodiment, first, all the inner target yawing moments MRqI are distributed to the inner rear wheels and all the outer target yawing moments MRqO are distributed to the outer rear wheels. Further, when the braking force BP (=BP1−BPO) of the outer rear wheel is negative, a part of the inner target yawing moment MRqI is distributed to the inner front wheel which is the driving wheel, and a part of the outer target yawing moment MRqO is distributed to the outer rear wheel which is the driving wheel.

The respective target yawing moments MRqI and MRqO may be distributed to the respective wheels by other methods without being limited thereto. For example, a part (for example, half) of the inner target yawing moment MRqI may be distributed to the inner rear wheel, and the rest of the inner target yawing moment MRqI may be distributed to the inner front wheel. In this case, a part (for example, half) of the outer target yawing moment MRqO is distributed to the outer rear wheel, and the rest of the outer target yawing moment MRqO is distributed to the outer front wheel. Further, when the braking force BP of the outer rear wheel is negative, it is preferable to change distribution of the front wheel and the rear wheel of the target yawing moments MRqI and MRqO such that the braking force BP of the outer rear wheel becomes equal to or larger than "0 (zero)".

Further, all the inner target yawing moment MRqI may be distributed to the inner front wheel which is the driving wheels, and all the outer target yawing moment MRqO may be distributed to the outer front wheel which is the driving wheel. In this case, even if the braking force BP (for example, the braking force BP of the outer front wheel) of some wheels is negative, the distribution of the front wheels and the rear wheels of the target yawing moments MRqI and MRqO may not be changed.

The vehicle provided with the travel assistance system of the vehicle may be a rear wheel drive vehicle or a four wheel drive vehicle rather than a front wheel drive vehicle. When the vehicle is a rear wheel drive vehicle, when the braking force BP (=BP1−BPO) of the outer front wheel is negative, it is preferable to change the distribution of the front wheels and the rear wheels of the target yawing moments MRqI and MRqO such that the braking force BP of the outer front wheel becomes equal to or larger than "0 (zero)", that is, the amount of decrease BPO of the braking force of the outer front wheels becomes equal to or less than the deceleration braking force BP1 of the outer front wheel.

Further, when the vehicle is a four wheel drive vehicle, if the drive torque of the engine 12 is increased to increase the driving force DP of some wheels, the driving forces DP of all the wheels FL, FR, RL, and RR increase. Therefore, it is preferable to offset the increment of the driving force of all the other wheels, by increasing the braking forces BP of all the wheels other than some wheels.

The vehicle may be a vehicle having a power source other than the engine 12 (for example, a hybrid vehicle or an electric vehicle).

When the vehicle is equipped with a power source for each wheel, even if the driving force DP of some wheels is increased, the driving force DP of other wheels is not increased. Therefore, the process of step S71 in FIG. 8 can be omitted.

Next, technical ideas capable of being grasped from the above embodiment and another embodiment will be described below.

(a) A vehicle travel assistance system which sets a difference in braking force between the left and right wheels of the vehicle when controlling the yawing motion of the vehicle on the basis of the set target yawing moment under the condition that the braking force is not applied to the vehicle, including:

in a case where a wheel located on the inner side at the time of the yawing motion of the vehicle is defined as an inner wheel, and a wheel located on the outer side is defined as the outer wheel, among the left and right wheels of the vehicle, a distribution unit which distributes half of the target yawing moment to the inner wheel and distributes the rest to the outer wheel;

an increase and decrease amount computation unit which increases an amount of increase of the braking force of the inner wheel as the target yawing moment distributed to the inner wheel increases; and a moment control unit which executes a moment control which increases the braking force of the inner wheel in accordance with the amount of increase of the braking force of the inner wheel set by the increase and decrease amount computation unit, and increases the driving force of the outer wheel as the target motion distributed to the outer wheel by the distribution unit is large.

According to the above configuration, since the target yawing moment set to cause the vehicle to perform the yawing motion is equally distributed to the inner wheel and the outer wheel, the magnitude of the amount of increase of the braking force of the inner wheel can be made equal to the magnitude of the amount of increase of the driving force of the outer wheel. Further, in the moment control, the difference in braking force between the inner wheel and the outer wheel is controlled by such an increase in braking force of the inner wheel and an increase in driving force of the outer wheel. As a result, it is possible to cause the vehicle to perform a desired yawing motion, while suppressing a change in the total of the braking and driving forces of the respective wheels. Therefore, it is possible to cause the vehicle to perform the yawing motion, while suppressing the change in the front-rear deceleration of the vehicle.

The invention claimed is:

1. A vehicle travel assistance system which controls a difference in braking force between a left wheel and a right wheel of the vehicle when causing the vehicle to perform a yawing motion on the basis of a set target yawing moment, comprising:

at least one processor configured to:

distribute half of the target yawing moment to an inner wheel and distribute the rest of the target yaw moment to an outer wheel, the inner wheel being a wheel, among the left wheel and the right wheel of the vehicle, located on an inner side at a time of the yawing motion, and the outer wheel being a wheel, among the left wheel and the right wheel of the vehicle, located on an outer side;

increase an amount of increase of a braking force of the inner wheel as the target yawing moment distributed to the inner wheel increases;

increase an amount of decrease in a braking force of the outer wheel as the target yawing moment distributed to the outer wheel increases;

execute a moment control which increases the braking force of the inner wheel in accordance with the amount of increase of the braking force of the inner wheel, and decreases the braking force of the outer wheel in accordance with the amount of decrease of the braking force of the outer wheel;

execute a deceleration control to decelerate the vehicle by applying the braking force to avoid a collision between the vehicle and an obstacle when the obstacle is present in front of the vehicle;

determine whether or not a relative speed can be set to "0 (zero)" or less in front of the obstacle, on the basis of a relation between the relative speed based on the obstacle and a predicted value of the time until the relative speed becomes equal to "0 (zero)" by the execution of the deceleration control, when both the deceleration control and the moment control are executed;

determine whether or not there is a wheel that will skid on the basis of the braking force of the wheel, a driving force of the wheel, and a lateral acceleration of the vehicle;

increase and correct the braking force of the outer wheel, when it is determined that it is possible to set the relative speed to "0 (zero)" or less in front of the obstacle, and it is determined that there is a wheel that will to skid; and decrease and correct the braking force of the outer wheel, when it is not determined that it is possible to set the relative speed to "0 (zero)" or less in front of the obstacle, and it is determined that there is a wheel that will skid, and wherein, when the at least one processor executes the moment control together with the deceleration control, the at least one processor is configured to:

make the braking force of the inner wheel equal to a sum of the braking force applied to the inner wheel by the deceleration control and an amount of increase of the braking force of the inner wheel, and make the braking force of the outer wheel equal to a difference obtained by subtracting the amount of decrease of the braking force of the outer wheel from the braking force applied to the outer wheel by the deceleration control.

2. The vehicle travel assistance system according to claim 1, wherein a torque, which is output from a power source of the vehicle, is transmitted to both the left wheel and the right wheel via a differential, and when the difference obtained by subtracting the amount of decrease of the braking force of the outer wheel from the braking force applied to the outer wheel by the deceleration control is negative, the at least one processor is configured to:

stop application of the braking force to the outer wheel, increase the torque output from the power source to increase a driving force of the outer wheel by an amount corresponding to the difference, and make the braking force of the inner wheel equal to a sum of the braking force applied to the inner wheel by the deceleration control, the amount of increase of the braking force of the inner wheel, and an amount of increase of a driving force of the inner wheel due to the increase in the driving force of the outer wheel.

3. The vehicle travel assistance system according to claim 1, wherein a torque, which is output from a power source of the vehicle, is transmitted to both the left wheel and the right wheel via a differential, and when the difference obtained by subtracting the amount of decrease of the braking force of the outer wheel from the braking force applied to the outer wheel before start of the moment control is negative, the at least one processor is configured to:

stop application of the braking force to the outer wheel, increase the torque output from the power source to increase a driving force of the outer wheel by an amount corresponding to the difference, and make the braking force of the inner wheel equal to a sum of the braking force applied to the inner wheel before start of the moment control, the amount of increase of the braking force of the inner wheel, and an amount of increase of a driving force of the inner wheel with the increase in the driving force of the outer wheel.

4. The vehicle travel assistance system according to claim 1, wherein, in a situation in which a direction of a yawing moment of the vehicle generated by an operation of a steering wheel of the vehicle is the same as a direction of yawing moment of the vehicle generated by the execution of the moment control and when a magnitude of the yawing moment of the vehicle generated by the operation of the steering wheel is equal to or less than a magnitude of the target yawing moment:

the at least one processor is configured to decrease and correct both the amount of increase of the braking force of the inner wheel and the amount of decrease of the braking force of the outer wheel.

5. The vehicle travel assistance system according to claim 1, wherein, in a situation in which a direction of a yawing moment of the vehicle caused by an operation of a steering wheel of the vehicle is the same as a direction of the yawing moment of the vehicle generated by the execution of the moment control and when a magnitude of the yawing moment of the vehicle generated by the operation of the steering wheel is larger than a magnitude of the target yawing moment:

the at least one processor is configured to not execute the moment control.

6. The vehicle travel assistance system according to claim 1, wherein when a direction of the yawing moment of the vehicle caused by an operation of a steering wheel of the vehicle is opposite to a direction of the yawing moment of the vehicle generated by the execution of the moment control, the at least one processor is configured to not execute the moment control.

7. The vehicle travel assistance system according to claim 2, wherein the at least one processor is configured to:

execute the deceleration control to avoid a collision between the vehicle and an obstacle when the obstacle is present in front of the vehicle, execute the moment control together with the deceleration control, determine whether or not a relative speed can be set to "0 (zero)" or less in front of the obstacle, on the basis of a relation between the relative speed based on the obstacle and a predicted value of the time until the relative speed becomes equal to "0 (zero)" by the execution of the deceleration control, when both the deceleration control and the moment control are executed, determine whether or not there is a wheel that will skid on the basis of the braking force of the wheel, a driving force of the wheel, and a lateral acceleration of the vehicle, increase and correct the braking force of the outer wheel, when it is determined that it is possible to set the relative speed to "0 (zero)" or less in front of the obstacle, and it is determined that there is a wheel that will skid, and decrease and correct the braking force of the outer wheel, when it is not determined it is possible to set the relative speed to "0 (zero)" or less in front of the obstacle, and it is determined that there is a wheel that will skid.

8. The vehicle travel assistance system according to claim 1, wherein, in a situation in which a direction of a yawing moment of the vehicle generated by an operation of a steering wheel of the vehicle is the same as a direction of the yawing moment of the vehicle generated by the execution of the moment control and when a magnitude of the yawing moment of the vehicle generated by the operation of the steering wheel is equal to or less than a magnitude of the target yawing moment:

the at least one processor is configured to decrease and correct both the amount of increase of the braking force of the inner wheel and the amount of decrease of the braking force of the outer wheel.

9. The vehicle travel assistance system according to claim 2, wherein, in a situation in which a direction of a yawing moment of the vehicle generated by an operation of a steering wheel of the vehicle is the same as a direction of the yawing moment of the vehicle generated by the execution of the moment control and when a magnitude of the yawing moment of the vehicle generated by the operation of the steering wheel is equal to or less than a magnitude of the target yawing moment:

the at least one processor is configured to decrease and correct both the amount of increase of the braking force of the inner wheel and the amount of decrease of the braking force of the outer wheel.

10. The vehicle travel assistance system according to claim 3, wherein, in a situation in which a direction of a yawing moment of the vehicle generated by an operation of a steering wheel of the vehicle is the same as a direction of the yawing moment of the vehicle generated by the execution of the moment control and when a magnitude of the yawing moment of the vehicle generated by the operation of the steering wheel is equal to or less than a magnitude of the target yawing moment:

the at least one processor is configured to decrease and correct both the amount of increase of the braking force of the inner wheel and the amount of decrease of the braking force of the outer wheel.

11. The vehicle travel assistance system according to claim 1, wherein, in a situation in which a direction of a yawing moment of the vehicle generated by an operation of a steering wheel of the vehicle is the same as a direction of the yawing moment of the vehicle generated by the execution of the moment control and when a magnitude of the yawing moment of the vehicle generated by the operation of the steering wheel is equal to or less than a magnitude of the target yawing moment:

the at least one processor is configured to decrease and correct both the amount of increase of the braking force of the inner wheel and the amount of decrease of the braking force of the outer wheel.

12. The vehicle travel assistance system according to claim 1, wherein, in a situation in which a direction of a yawing moment of the vehicle caused by an operation of a steering wheel of the vehicle is the same as a direction of the yawing moment of the vehicle generated by the execution of the moment control and when a magnitude of the yawing moment of the vehicle generated by the operation of the steering wheel is larger than a magnitude of the target yawing moment:

the at least one processor is configured to not execute the moment control.

13. The vehicle travel assistance system according to claim 2, wherein, in a situation in which a direction of a yawing moment of the vehicle caused by an operation of a steering wheel of the vehicle is the same as a direction of the yawing moment of the vehicle generated by the execution of the moment control and when a magnitude of the yawing moment of the vehicle generated by the operation of the steering wheel is larger than a magnitude of the target yawing moment:

the at least one processor is configured to not execute the moment control.

14. The vehicle travel assistance system according to claim 3, wherein, in a situation in which a direction of a yawing moment of the vehicle caused by an operation of a steering wheel of the vehicle is the same as a direction of the yawing moment of the vehicle generated by the execution of the moment control and when a magnitude of the yawing moment of the vehicle generated by the operation of the steering wheel is larger than a magnitude of the target yawing moment:

the at least one processor is configured to not execute the moment control.

15. The vehicle travel assistance system according to claim 1, wherein, in a situation in which a direction of a yawing moment of the vehicle caused by an operation of a steering wheel of the vehicle is the same as a direction of the yawing moment of the vehicle generated by the execution of the moment control and when a magnitude of the yawing moment of the vehicle generated by the operation of the steering wheel is larger than a magnitude of the target yawing moment:

the at least one processor is configured to not execute the moment control.

16. The vehicle travel assistance system according to claim 1, wherein when a direction of the yawing moment of the vehicle caused by an operation of a steering wheel of the vehicle is opposite to a direction of the yawing moment of the vehicle generated by the execution of the moment control, the at least one processor is configured to not execute the moment control.

17. The vehicle travel assistance system according to claim 2, wherein when a direction of the yawing moment of the vehicle caused by an operation of a steering wheel of the vehicle is opposite to a direction of the yawing moment of the vehicle generated by the execution of the moment control, the at least one processor is configured to not execute the moment control.

18. The vehicle travel assistance system according to claim 3, wherein when a direction of the yawing moment of the vehicle caused by an operation of a steering wheel of the vehicle is opposite to a direction of the yawing moment of the vehicle generated by the execution of the moment control, the at least one processor is configured to not execute the moment control.

* * * * *